United States Patent
Dey et al.

(10) Patent No.: US 10,897,494 B2
(45) Date of Patent: Jan. 19, 2021

(54) DIVERSIFIED FILE TRANSFER

(71) Applicant: Software AG, Darmstadt (DE)

(72) Inventors: Subhasish Dey, Burdwan (IN);
Biswajit Bhuyan, Bangalore (IN);
Sanju Krishnan Retnakumari,
Bangalore (IN); Bhaskar Bhattarai,
Bangalore (IN)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 16/444,647

(22) Filed: Jun. 18, 2019

(65) Prior Publication Data

US 2020/0404044 A1  Dec. 24, 2020

(51) Int. Cl.
*H04L 29/08* (2006.01)
*G06F 16/178* (2019.01)
*H04L 29/06* (2006.01)

(52) U.S. Cl.
CPC ............ *H04L 67/06* (2013.01); *G06F 16/178* (2019.01); *H04L 29/06* (2013.01); *H04L 63/0428* (2013.01)

(58) Field of Classification Search
CPC ..... H04L 67/06; H04L 29/06; H04L 63/0428; G06F 16/178
See application file for complete search history.

(56) References Cited

U.S. PATENT DOCUMENTS

| | | | |
|---|---|---|---|
| 5,367,698 A | 11/1994 | Webber et al. | |
| 6,085,251 A | 7/2000 | Fabozzi, II | |
| 6,807,632 B1 | 10/2004 | Carpentier et al. | |
| 7,506,034 B2 | 3/2009 | Coates et al. | |
| 2011/0218981 A1* | 9/2011 | Retnakumari | G06F 9/544 707/705 |
| 2012/0233293 A1 | 9/2012 | Barton et al. | |
| 2013/0332996 A1* | 12/2013 | Fiala | G06F 21/53 726/4 |
| 2015/0180963 A1* | 6/2015 | Luecke | H04L 67/327 709/203 |

* cited by examiner

*Primary Examiner* — June Y Sison
(74) *Attorney, Agent, or Firm* — Posz Law Group, PLC

(57) ABSTRACT

A file is transferred between client and server. The client determines file transfer resources and good time slots available at the client, and communicates a file transfer plan to upload the file to the server; the file transfer plan specifies the file resources available at the client and time slots. The server acknowledges the file transfer plan, possibly with adjustments to the available time slots, and the server communicates a postbox indicating the location where the file is to be uploaded. The client executes a file transfer process specified in the file transfer plan, based on the file transfer resources available at the server and client, to upload the file to a respective location specified by the postbox. There may be plural uploads of parts of the file, at different available time slots, and/or different combinations of file transfer resources specified in the acknowledged file transfer plan.

22 Claims, 18 Drawing Sheets

|  | Parameters |  | Baseline Table - Raw Data | | | | | |
|---|---|---|---|---|---|---|---|---|
|  |  |  | Busy Day | | | Non Busy Day | | |
|  |  |  | 8:00 - 16:00 | 16:00 - 00:00 | 00:00 - 08:00 | 8:00 - 16:00 | 16:00 - 00:00 | 00:00 - 08:00 |
| Throughput of the channels | TCP | Inbound (MBps) | 256 | 100 | 10 | 10 | 2 | 1 |
|  |  | Outbound (MBps) | 1024 | 50 | 5 | 5 | 1 | 1 |
|  |  | Peer to Peer (MBps) | 2048 | 10 | 1 | 1 | 1 | 0 |
|  | UDP | Inbound (MBps) | 10 | 10 | 10 | 1 | 1 | 2 |
|  |  | Outbound (MBps) | 1 | 1 | 1 | 1 | 1 | 1 |
|  |  | Peer to Peer (MBps) | 20 | 20 | 20 | 20 | 20 | 20 |
|  | HTTP/s | Inbound (MBps) | 128 | 50 | 5 | 5 | 1 | 0.5 |
|  |  | Outbound (MBps) | 512 | 25 | 2.5 | 2.5 | 0.5 | 0.5 |
|  |  | Peer to Peer (MBps) | 1024 | 5 | 0.5 | 0.5 | 0.5 | 0 |
|  | FTP/s | Inbound (MBps) | 64 | 25 | 2.5 | 2.5 | 0.5 | 0.25 |
|  |  | Outbound (MBps) | 256 | 12.5 | 1.25 | 1.25 | 0.25 | 0.25 |
|  |  | Peer to Peer (MBps) | 512 | 2.5 | 0.25 | 0.25 | 0.25 | 0 |
| Remote endpoint | SFTP | Inbound (MBps) | 51.2 | 20 | 2 | 2 | 0.4 | 0.2 |
|  |  | Outbound (MBps) | 204.8 | 10 | 1 | 1 | 0.2 | 0.2 |
|  |  | Peer to Peer (MBps) | 409.6 | 2 | 0.2 | 0.2 | 0.2 | 0 |

FIG. 6A

Baseline Table - Raw Data

| Remote endpoint | | Metric | 607 | 609 | 611 | 613 | 615 | 617 |
|---|---|---|---|---|---|---|---|---|
| | Others | Inbound (MBps) | 12.8 | 5 | 0.5 | 0.5 | 0.1 | 0.05 |
| | | Outbound (MBps) | 51.2 | 2.5 | 0.25 | 0.25 | 0.05 | 0.05 |
| | | Peer to Peer (MBps) | 102.4 | 0.5 | 0.05 | 0.05 | 0.05 | 0 |
| Performance | Packet size < 512 KB | Network Delay (mili-secs) | 1000 | 500 | 10 | 10 | 10 | 10 |
| | | Packet drop (%) | 10 | 6 | 0.4 | 0.4 | 0.4 | 0.4 |
| | | Buffer underflow (Rating) | 5 | 8 | 10 | 10 | 10 | 10 |
| | Packet size >= 512 KB | Network Delay (mili-secs) | 1300 | 300 | 10 | 10 | 10 | 10 |
| | | Packet drop (%) | 15 | 8 | 0.4 | 0.4 | 0.4 | 0.4 |
| | | Buffer overflow (Rating) | 10 | 8 | 3 | 3 | 3 | 3 |
| Congestion | Response time | Inbound (mili-secs) | 600 | 100 | 10 | 10 | 10 | 10 |
| | | Outbound (mili-secs) | 1300 | 100 | 10 | 10 | 10 | 10 |
| | | Peer to Peer (mili-secs) | 10 | 10 | 10 | 10 | 10 | 10 |
| | Queing Delay | Inbound (mili-secs) | 10 | 8 | 3 | 3 | 3 | 3 |
| | | Outbound (mili-secs) | 600 | 100 | 10 | 10 | 10 | 10 |
| | | Peer to Peer (mili-secs) | 10 | 10 | 10 | 10 | 10 | 10 |
| | Packet loss | Inbound (%) | 15 | 8 | 0.4 | 0.4 | 0.4 | 0.4 |
| | | Outbound (%) | 15 | 8 | 0.4 | 0.4 | 0.4 | 0.4 |
| | | Peer to Peer (%) | 15 | 8 | 0.4 | 0.4 | 0.4 | 0.4 |

FIG. 6B

| Day usage table ||
|---|---|
| Day | Weighted Average |
| Sunday | 100 |
| Monday | 400 |
| Tuesday | 400 |
| Wednesday | 600 |
| Thursday | 300 |
| Friday | 700 |
| Saturday | 100 |

FIG. 7

| Baseline Table - Model Data | | | Busy Day | | | Non Busy Day | | |
|---|---|---|---|---|---|---|---|---|
| Parameters | | | 8:00 - 16:00 | 16:00 - 00:00 | 00:00 - 08:00 | 8:00 - 16:00 | 16:00 - 00:00 | 00:00 - 08:00 |
| Throughput of the channels | TCP | Inbound (Rating) | 6 | 4 | 3 | 2 | 1 | 1 |
| | | Outbound(Rating) | 7 | 5 | 2 | 2 | 1 | 1 |
| | | Peer to Peer(Rating) | 8 | 6 | 1 | 2 | 1 | 1 |
| | UDP | Inbound (Rating) | 4 | 4 | 1 | 1 | 1 | 1 |
| | | Outbound(Rating) | 1 | 1 | 1 | 1 | 1 | 1 |
| | | Peer to Peer(Rating) | 4 | 4 | 1 | 1 | 1 | 1 |
| Remote endpoint | HTTP/s | Inbound (Rating) | 3 | 2 | 1 | 1 | 1 | 1 |
| | | Outbound(Rating) | 3 | 2 | 1 | 1 | 1 | 1 |
| | | Peer to Peer(Rating) | 4 | 3 | 1 | 1 | 1 | 1 |
| | FTP/s | Inbound (Rating) | 1 | 1 | 1 | 1 | 1 | 1 |
| | | Outbound(Rating) | 2 | 2 | 1 | 1 | 1 | 1 |
| | | Peer to Peer(Rating) | 2 | 2 | 1 | 1 | 1 | 1 |
| | SFTP | Inbound (Rating) | 2 | 1 | 1 | 1 | 1 | 1 |
| | | Outbound(Rating) | 2 | 1 | 1 | 1 | 1 | 1 |
| | | Peer to Peer(Rating) | 2 | 2 | 1 | 1 | 1 | 1 |
| | Others | Inbound (Rating) | 2 | 1 | 1 | 1 | 1 | 1 |
| | | Outbound(Rating) | 2 | 1 | 1 | 1 | 1 | 1 |
| | | Peer to Peer(Rating) | 2 | 1 | 1 | 1 | 1 | 1 |
| Performance | Packet size < 512 KB | Network Delay(Rating) | 8 | 5 | 1 | 1 | 1 | 1 |
| | | Packet drop (Rating) | 10 | 6 | 1 | 1 | 1 | 1 |
| | | Buffer underflow (Rating) | 5 | 8 | 1 | 1 | 1 | 1 |
| | Packet size >= 512 KB | Network Delay(Rating) | 10 | 5 | 1 | 1 | 1 | 1 |
| | | Packet drop (Rating) | 10 | 5 | 1 | 1 | 1 | 1 |
| | | Buffer overflow (Rating) | 10 | 8 | 3 | 1 | 1 | 1 |

FIG. 8A

| Baseline Table - Model Data | | | | | | | | |
|---|---|---|---|---|---|---|---|---|
| Cong-estion | Response time | Inbound (Rating) | 8 | 4 | 1 | 1 | 1 | 1 |
| | | Outbound (Rating) | 8 | 3 | 1 | 1 | 1 | 1 |
| | | Peer to Peer (Rating) | 4 | 1 | 1 | 1 | 1 | 1 |
| | Queing Delay | Inbound (Rating) | 10 | 8 | 1 | 1 | 1 | 1 |
| | | Outbound (Rating) | 10 | 4 | 1 | 1 | 1 | 1 |
| | | Peer to Peer (Rating) | 1 | 1 | 1 | 1 | 1 | 1 |
| | Packet loss | Inbound (Rating) | 10 | 8 | 2 | 2 | 1 | 1 |
| | | Outbound (Rating) | 10 | 8 | 2 | 2 | 1 | 1 |
| | | Peer to Peer (Rating) | 10 | 8 | 2 | 2 | 1 | 1 |

| Day usage table | |
|---|---|
| Day | Busy / Non Busy |
| Sunday | Non Busy day |
| Monday | Busy day |
| Tuesday | Busy day |
| Wednesday | Busy day |
| Thursday | Busy day |
| Friday | Busy day |
| Saturday | Non Busy day |

|  | Points | Weightage | Weighted Point |
|---|---|---|---|
| Throughput of the channels | 4 | 35 | 1.4 |
| Remote endpoint | 3 | 15 | 0.45 |
| Performance | 1 | 25 | 0.25 |
| Congestion | 1 | 25 | 0.25 |
|  |  |  |  |
| Overall Rating |  |  | 2.35 |

FIG. 10

| Parameters | Weighted Average | | | | | |
|---|---|---|---|---|---|---|
|  | Busy Day | | | Non Busy Day | | |
|  | 8:00 - 16:00 | 16:00 - 00:00 | 00:00 - 08:00 | 8:00 - 16:00 | 16:00 - 00:00 | 00:00 - 08:00 |
| Weighted Average | 8 | 5.6 | 3 | 2 | 2 | 1 |

FIG. 11

| Slot No | date-range | time-range | parallel-upload | endpoint | preference |
|---|---|---|---|---|---|
| 1 | 22-25-Jan | 08:00 - 16:00 | 2 | FTPS | 8 |
| 2 | 22-25-Jan | 16:00 - 00:00 | 10 | FTPS | 2 |
| 3 | 22-25-Jan | 00:00 - 08:00 | 10 | FTPS | 2 |
| 4 | 26-27-Jan | 08:00 - 16:00 | 20 | FTPS | 1 |
| 5 | 26-27-Jan | 16:00 - 00:00 | 20 | FTPS | 1 |
| 6 | 26-27-Jan | 00:00 - 08:00 | 20 | FTPS | 1 |
| 7 | 28-29-Jan | 08:00 - 16:00 | 2 | FTPS | 8 |
| 8 | 28-29-Jan | 16:00 - 00:00 | 10 | FTPS | 2 |
| 9 | 28-29-Jan | 00:00 - 08:00 | 10 | FTPS | 2 |

| Segment | Segment Size | Checksum |
|---|---|---|
| 1 | 1024MB | chk1 |
| 2 | 1024MB | chk2 |
| 3 | 512MB | chk3 |
| ... | | |
| n | 512MB | chkn |

| Day usage table ||||
| date-range | time-range | Day | Weighted Average |
|---|---|---|---|
| 26-27 Jan | 08:00 - 16:00 | | Busy day |
| 26-27 Jan | 16:00 - 00:00 | | Busy day |
| 26-27 Jan | 00:00 - 08:00 | | Busy day |
| 26-27 Jan | 08:00 - 16:00 | | Non Busy day |
| 26-27 Jan | 16:00 - 00:00 | | Non Busy day |
| 28-29 Jan | 16:00 - 00:00 | | Busy day |
| 28-29 Jan | 00:00 - 08:00 | | Busy day |
| 28-29 Jan | 08:00 - 16:00 | | Non Busy day |
| 30-31 Jan | 08:00 - 16:00 | | Non Busy day |
| 30-31 Jan | 16:00 - 00:00 | | Non Busy day |
| 30-31 Jan | 00:00 - 08:00 | | Non Busy day |

Requested date by client, which is a busy day for server extended window given by server

FIG. 15

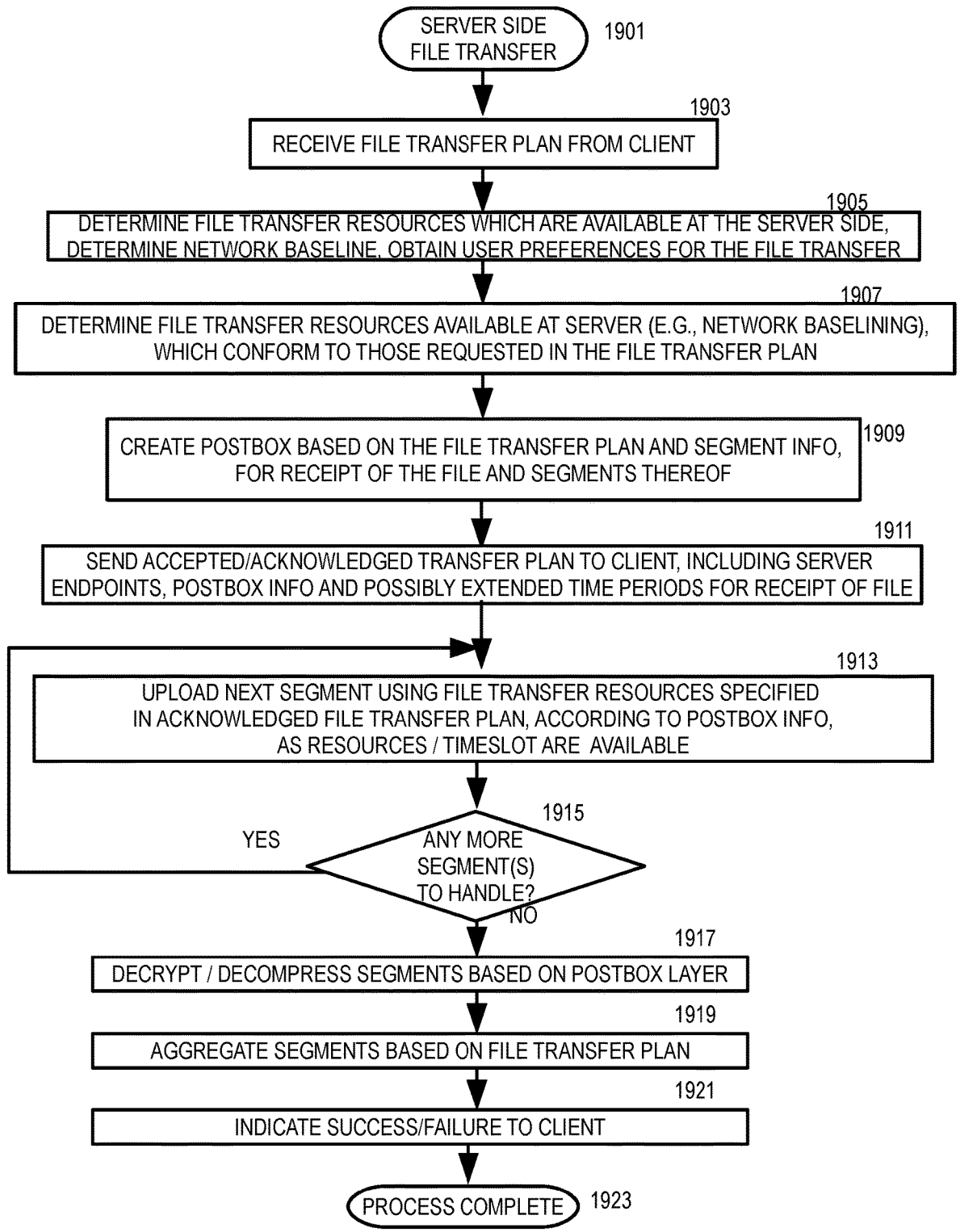

DIVERSIFIED FILE TRANSFER

TECHNICAL FIELD

The technical field relates in general to file transfer from one computer system to another computer system.

BACKGROUND

A file transfer is a process of transferring by copying or moving one or more files from an end point at one computer to an end point at another computer over a network or internet connection. A classical file transfer method defines predefined channels, interfaces, security, and compression mechanisms to which both the parties to the transfer (the server and the client) must strictly align to complete a file transfer.

A file transfer may fail for various reasons. The problem of a file transfer failure is especially acute when the file transfer fails while attempting to transfer a large file. There is a need for improvement with regard to file transfer techniques.

SUMMARY

Accordingly, one or more embodiments provide a method, system, and/or a non-transitory computer readable storage medium for a file transfer. At a client, the method includes determining file transfer resources which are available at the client; communicating a file transfer plan to upload a file to a server, the file transfer plan specifies the determined file transfer resources which are available at the client; receiving an acknowledgement of the file transfer plan which includes information identifying a postbox for receipt at the server of the file and which identifies file transfer resources which are available at the server; and executing a file transfer process specified in the file transfer plan, based on the file transfer resources which are available at the server and at the client, to upload the file to a location specified by the postbox.

At the client, the method may include automatically generating a model indicating throughput, performance, and congestion of the file transfer resources at different time slots at the client, based on the file transfer resources and network performance during operation of the client; and from the model, automatically determining preferred combinations of the file transfer resources and the different time slots to upload the file; and generating the file transfer plan which specifies the determined preferred combinations of file transfer resources and the different time slots to upload the file. The file transfer process is executed as specified in the file transfer plan which is based on the baseline of the network.

The method may include, at the client: network baselining the client, during the operation of the client, to determine the throughput, the performance, and the congestion of the file transfer resources which are available at the client, wherein the model is generated based on the network baselining results.

In the method, the network baselining may be further determined based on bypassing (i) security restrictions, (ii) throttling, and (iii) vulnerability checks, and based on promoted time slots.

The method may include, at the client: segmenting the file into a plurality of data segments, based on the file transfer plan, wherein the file transfer process uploads each segment of the plurality of data segments, wherein the file transfer plan further includes information identifying the plurality of data segments, wherein the upload of the plurality of data segments is in a plurality of file transfer sessions across a plurality of the different time slots specified by the file transfer plan.

The method may further include, at the client, determining whether one of the plurality of time slots is current. When determined to not be current, waiting to execute a next file transfer session of the plurality of file transfer sessions to upload a next data segment of the plurality of data segments, until one of the plurality of time slots is available. When determined to be current, continuing or commencing the file transfer session of the next data segment.

In the method, at least two of the different file transfer sessions may be performed in parallel.

At a server, a method of a file transfer may include receiving a file transfer plan to upload a file from a client, the file transfer plan specifies the file transfer resources which are available at the client; determining file transfer resources which are available at the server which conform to the file transfer resources specified by the client in the file transfer plan; creating a postbox based on the file transfer plan with the determined file transfer resources, for receipt at the server of the file; communicating, to the client, information identifying the postbox and the file transfer resources which are available at the server; and executing a file transfer process specified in the file transfer plan, to receive the file.

At the server, the method may further include automatically generating a model indicating throughput, performance, and congestion of the file transfer resources at different time slots at the server, based on the file transfer resources and network performance during operation of the server; from the model, automatically determining preferred combinations of the file transfer resources and the different time slots to upload the file; determining portions of the file transfer plan which match the model of the server; and generating an acknowledged/accepted file transfer plan which further indicates the file transfer resources available at the server, wherein the file transfer resources communicated to the client are based on the portions of the file transfer plan and the file transfer resources which are available at the server.

At the server, the method may further include network baselining the server, during the operation of the server, to determine the throughput, the performance, and the congestion of the file transfer resources which are available at the server, wherein the model of the server is automatically generated based on the network baselining results.

In the method at the server, the network baselining may be further determined based on bypassing (i) security restrictions, (ii) throttling, and (iii) vulnerability checks, and based on promoted time slots.

In the method at the server, the file transfer plan may further include information identifying a plurality of data segments into which the file is segmented; the postbox identifies a respective location for receipt of each of the data segments. The method at the server may further include receiving a plurality of data segments into each of the respective data segments; and assembling the respective data segments into the uploaded file.

In the method at the server, the receiving of the plurality of segments is in different file transfer sessions across a plurality of time slots specified by the file transfer plan.

Furthermore, one or more embodiments may include a combination of one or more of the foregoing at a client, and/or at a server.

In another embodiment, a combination of one or more of the foregoing may be performed complementarily at a server and a client.

In another embodiment, a processor at a client, and/or at a server, is configured to execute instructions to perform a combination of one or more of the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 6A and FIG. 6B, collectively, FIG. 6, is a baseline table illustrating raw data.

FIG. 7 is an example day usage table.

FIG. 8A and FIG. 8B, collectively, FIG. 8, is an example baseline table with model data.

FIG. 9 is an example day usage table based on FIG. 8.

FIG. 10 is an example table with modeled data.

FIG. 11 is an example table illustrating a weighted average of the time slots based on FIG. 8.

FIG. 12 is an example table illustrating slots based on upload size determined based on weighted average.

FIG. 13 is an example table of data segments based on FIG. 10 to FIG. 12.

FIG. 15 illustrates an example day usage table.

FIG. 19 is a flow chart illustrating a server side file transfer procedure.

DETAILED DESCRIPTION

I. Introduction

Figure 1:
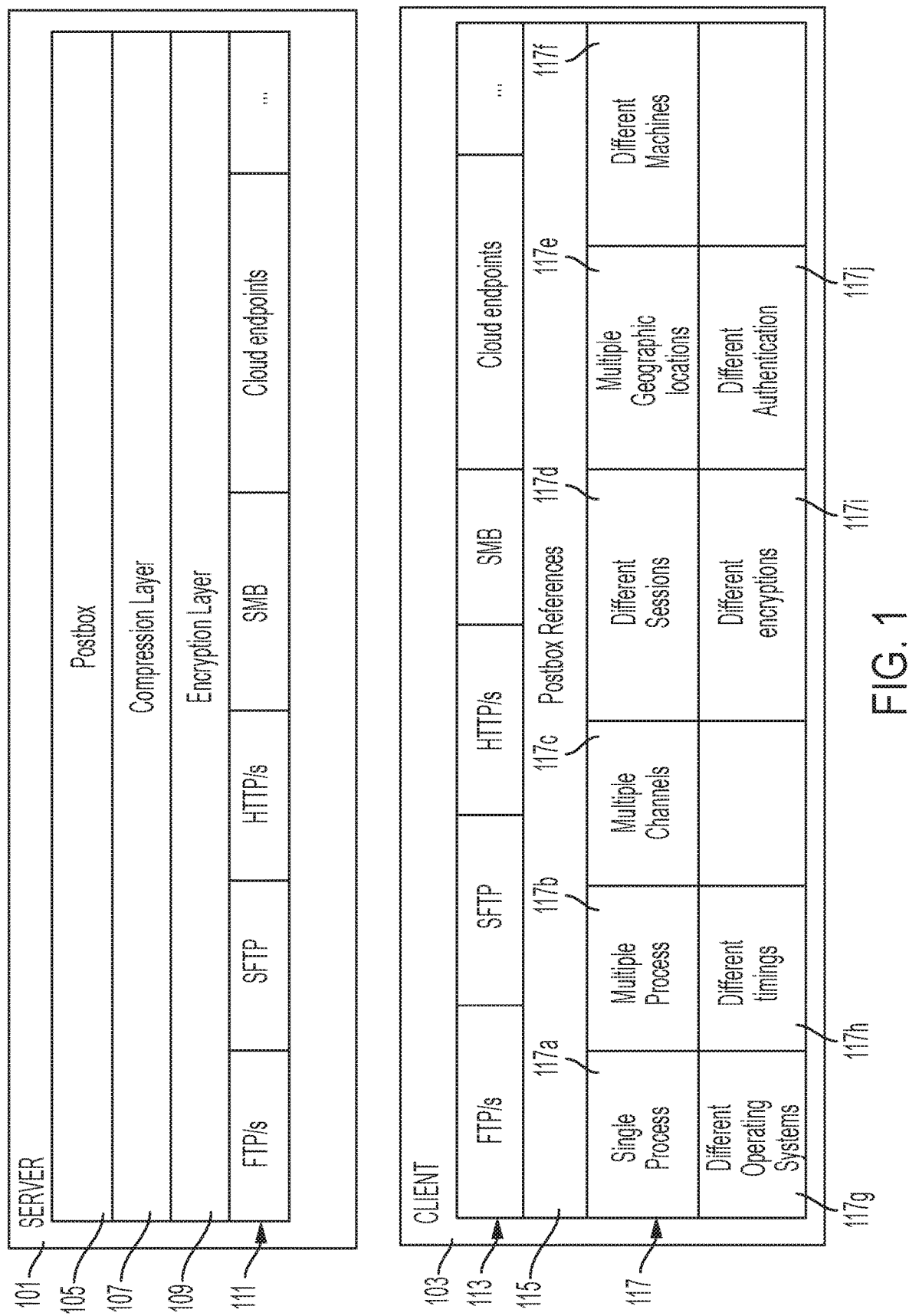
FIG. 1 is a diagram illustrating a simplified and representative client and server environment associated with a diversified file transfer.

In overview, the present disclosure concerns a file transfer in which both client and server in a file transfer arrive at a plan before hand to complete a single file transfer, which can be diversified across channels, processes, machines, sessions, geographic locations, authentication mechanisms, encryption techniques, and/or time periods. More particularly, various inventive concepts and principles are embodiments in systems, devices, and methods therein for a technique in which the client comes up with its best suitable strategy to transfer the file and communicates the transfer plan to the server; the server, based on the transfer plan, exposes a best suitable storage in the desired medium to the client for a certain time period. The client understands or recognize its strengths, security restrictions and platform vulnerabilities beforehand and then plans its transfer. The technique disclosed herein provides a platform for the file transfer by defining, in a transfer plan, diverse ways to complete a single file transfer, which are diversified in a variety of ways, including one or more of multiple channels, processes, machines, sessions, geographic locations, authentication mechanisms, and/or encryption techniques, at different time periods. This also addresses ways in which server should treat the data coming from different entities and then aggregate the data from different entities into the desired object. This method stands in contrast to the classical method of file transfer where the server is the sole facilitator of the file, where it exposes the file, the connecting endpoints, authentication mechanisms, encryption mechanisms, and compression techniques; by comparison this technique helps the client to strategize based on its environment, on how it wants to process the file and the server acts to its request.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

As further discussed herein below, various inventive principles and combinations thereof are advantageously employed to provide a very robust and fail proof technique to address the issues of a huge file transfer over fluctuating networks.

II. State of the Art

A. Overview—State of the Art and Observations

The following provides a discussion of a few restrictions, which are faced by users transferring data over the internet.

1. Restricted Bandwidth.

Businesses run on bandwidth. Any modern business requires high speed internet to function effectively, and bandwidth provides the stage for fast internet to run wild. But how much bandwidth is sufficient for a particular business to run. That business runs into the cycle of demand and supply. As the bandwidth increases, a user's habits change based on the available internet speed, and they tend to use more and more.

This results in consumption of more bandwidth by few individuals and this eventually leads to others suffering from low internet speed.

To handle these situations, organizations define

1. Throttling rule
   a. Restricting individual speed at different timelines.
   b. Restricting data usage at different timelines,
   c. Restricting protocol based usage.

2. Use of Proxy servers
3. Use of Cache Servers
2. Fluctuating Networks

Network fluctuations are not good for business. Hardware failures are the number one reason for network fluctuations. The following are the top ten reasons for network downtime; any of these in any layer of the connection will cause a network fluctuation.

1. Faults, errors or discards in network devices
2. Device configuration changes
3. Operational human errors and mismanagement of devices
4. failure caused due to fiber cable cuts or network congestion
5. Power outages
6. Server hardware failure
7. Security attacks such as denial of service (DoS)
8. Failed software and firmware upgrade or patches
9. incompatibility between firmware and hardware device
10. Unprecedented natural disasters and ad hoc mishaps on the network such as a minor accidents, or even as unrelated as a rodent chewing through a network line, etc.

3. Problem Scenarios

The following are a few scenarios, which need a file transfer solution.

Scenario 1: Long Hours

Assume a situation that a user wants to upload a file size of 1 TB from his company network. His company has a bandwidth of 50 Mbps. However, the company has about 2000 employees using the internet during the working hours of 10 AM to 6 PM. During the working hours the company bandwidth is heavily used by all employees with a resulting speed to any user of 1 Mbps or even less. However, the speed increases with less usage during non-core working hours and shoots up to an average of 10-20 Mbps.

So the time taken by the user to upload the file limited to core working hours is (1 TB @ 1 Mbps) is 291 hours; during the full 24-hour day (1 TB @ Avg-7 Mbps) the time taken is 41 hours.

Now without any extra intelligence, the upload is at the mercy of all the unnecessary throttling restrictions, unnecessary data monitoring, all types of network fluctuations and even as small hindrance in the upload over the huge time period of 41 hours, will result in the failure of the whole file.

This results in a very high probability of a failed transfer.

The likely failed transfer costs the user a huge amount of time, data, money, and may even result in the incapability of the user to upload that big file.

Scenario 2: Processed Upload

Assume a different situation that a client wants to upload a file size of 1 TB, and the data corresponds to content which can be easily compressed to 30% of its size. But any kind of data processing like compression, encryption, checksum calculation, etc. would be very difficult for a file with a size of 1 TB as it will consume a huge amount of time and memory, if this was processed in a conventional single linear approach.

Scenario 3: Transfer Protocol

Assume a third situation in which the server exposes its directory where file needs to be uploaded via a specific FTPS port, which also needs random data ports to be accessible from the client machine and due to security restrictions. However, the firewall in the user's environment does not allow that.

Scenario 4: Data Sniffing and Hijacking

Technology is growing very fast and so are the attackers, with all kind of advanced data hijacking techniques discovered day by day. If the entirety of the data is sent using the same encryption technique, through the same channel, it would not be very tough for the hijackers to understand or sniff the predefined encryption techniques, read the user's data, and derive meaningful information out of it.

4. Conventional Solutions

To address these scenarios, there are few known solutions available. Representative conventional techniques are outlined below.

WinSCP: Pause and resume a file transfer

WinSCP™ (Windows Secure Copy) is a free and open-source SFTP™ protocol, FTP™ protocol, WebDAV™ protocol, AMAZON™ protocol and/or SCP™ client for MICROSOFT WINDOWS™ software. This provides the functionality to pause a file transfer and then resume from where it had last left. This solution has several drawbacks.

1. This functionality is only supported for FTP and SFTP protocols. The most important HTTPS and cloud endpoints like S3™ endpoints and AZURE™ endpoints are not covered.

2. This implementation is not so robust and does not take care of the identity of the file which is already uploaded. It resumes based on file size, it just overlooks the size of the target in the source and starts the transfer. It fails to identify if the version of the file to be uploaded and the version which is already uploaded are different, performing a blind merge.

3. With this implementation, efficient resource management by using multiple channels or parallel file upload is not possible, as the file is always processed in line.

Acceleration: Parallel File Transfer Protocol

An apparatus and method may improve the speed of electronic file transfer between remote computers by parallel processing. This patented technology mentions creating multiple channels based on available bandwidth and then completing the file transfer by doing an efficient utilization of its resources. This solution has drawbacks.

1. Does not address failure scenarios. This technology fails to answer problems when the server or client is disconnected or any of them is down for some time. When this occurs, the state of the already uploaded content is lost in the server and the download needs to be started again.

2. Struggles in fluctuating network. For networks where there are massive fluctuations in the quality of bandwidth available, this solution struggles as the number of parallel connections is very much dependent on the bandwidth available; this system invests much of its resources in manipulating its channels, thereby negatively affecting overall transfer.

BITTORRENT™ file transfer (US 2012/0233293) BitTorrent™ file transfer is a communication protocol for peer-to-peer file sharing (P2P) which is used to distribute data and electronic files over the Internet. BitTorrent™ file transfer is one of the most common protocols for transferring large files, such as digital video files containing TV shows or video clips or digital audio files containing songs. Peer-to-peer networks have been estimated to collectively account for approximately 43% to 70% of all Internet traffic. Although the BitTorrent™ file transfer may be good for P2P architecture, it not suitable for a client server architecture, because a. The traffic and usage cannot be monitored properly.
b. The security aspect of the peer machines are at risk as their identity is compromised.

c. It is tough for a network admin, to manage firewalls to handle this traffic.

III. Aspects of the Approach

A. Concept

A diversified file transfer includes, for example, a technique, where a component performs a network baselining on its and the server's network, understands its security restrictions, cost restrictions and platform vulnerabilities beforehand, and then comes up with a plan to perform and/or complete a file transfer. The concept has aspects which cover both a server side and a client side, mutually coordinated, as discussed in more detail below.

While planning for the upload, the client can diversify its transfer across a combination of one or more of the following: multiple channels, processes, machines, sessions, geographic locations, authentication mechanisms, encryption techniques, and/or different time periods.

After planning the transfer, the client communicates the plan to the server; the server then acknowledges the plan, based on which the transfer can be completed.

Figure 2:
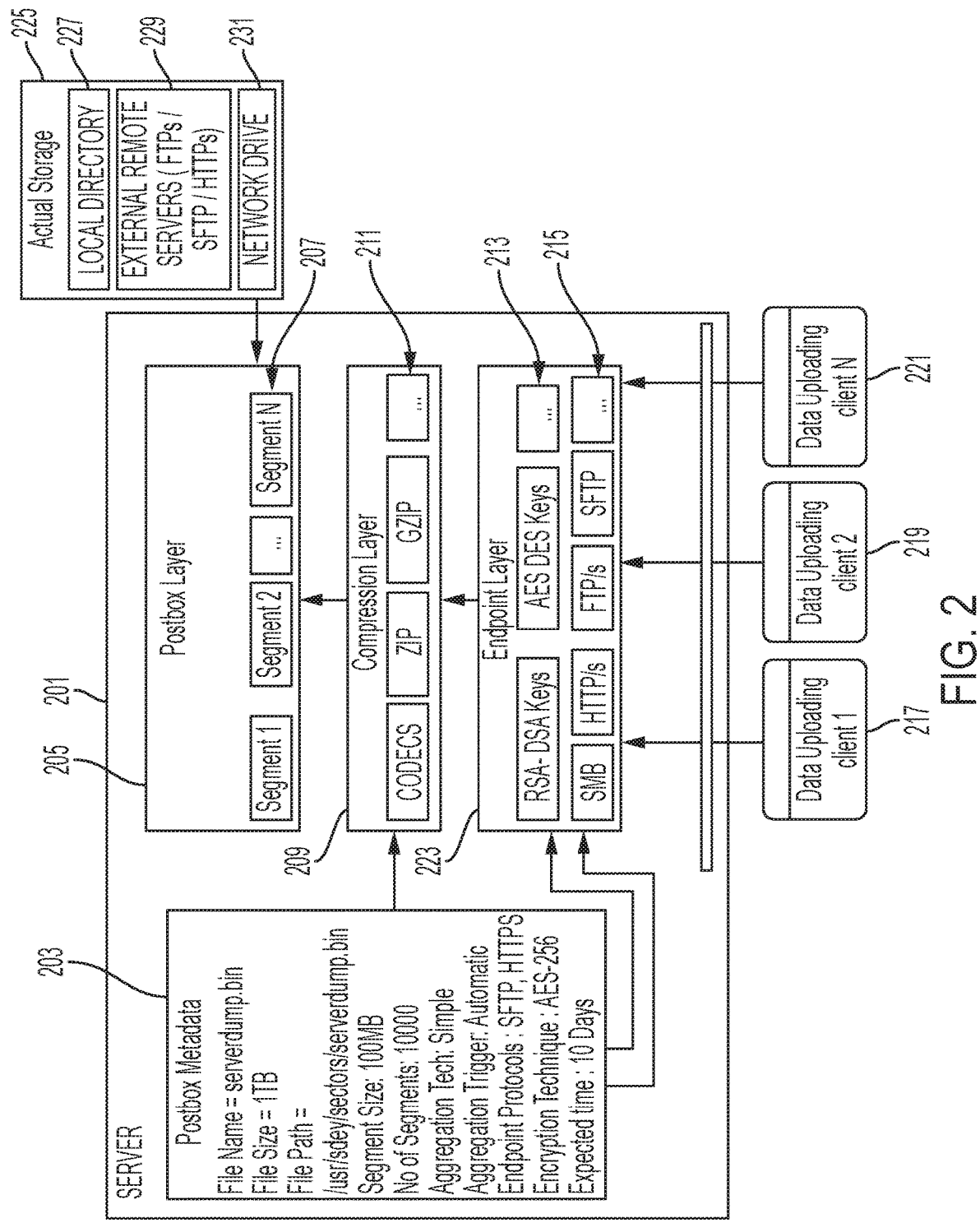
FIG. 2 is a block diagram illustrating interaction between layers at the server side.

Server side and client side for a diversified file transfer are discussed in connection with FIG. 1 to FIG. 4. FIG. 1 illustrates the basic server side and client side layers. FIG. 2 illustrates interaction between layers at the server 101 side; and FIG. 3 outline a basic process for client and server to negotiate a file transfer plan and then to transfer the file. FIG. 4 illustrates an interaction sequence for a diversified file transfer.

FIG. 1 illustrates the layers which the proposed idea deals with. The layers in FIG. 1 demonstrate a set of segregated actions which are performed on the actual data based on the metadata of the data. FIG. 1 illustrates a server 101 and a client 103. The server 101 includes a postbox layer 105, a compression layer 107, an encryption layer 109, and endpoints 111. The client 103 includes endpoints 113, and postbox references 115.

B. Server Side

1. Postbox Layer

The postbox layer 105 is a part of a new server-side file transfer layer created at the server, based on the file transfer request by the client. The postbox layer 105 can be created in response to a file transfer request by the client. The postbox layer 105 can be created, for example, on the local storage, mounted drive or any other network drives connected through various other protocols.

The postbox layer 105 can be identified by a postbox id, which uniquely identifies the postbox layer as being associated with a specific file transfer request by the client. The postbox layer 105 can be provided with an expiry date as specified by the client, which may also be approved by the server. The postbox layer 105 may contain multiple segments of data from the file which is being transferred; each data segment may be provided with a data integrity value (for example, a checksum, as discussed further herein) as notified by the client.

When the data is transferred to the postbox area, and the data transferred checksum matches the checksum of the segment as mentioned by client.

The segment and then eventually the postbox will be considered as successfully transferred.

2. Compression Layer

One or more embodiments of the server 101 side can include a compression layer 107, and/or an encryption layer 109. The compression layer 107 can be an extension of the postbox layer 105, which may include an encryption compression layer 109. The compression layer 107 and/or encryption layer 109 may have customized decryption and/or or de-compression techniques as per mentioned by the client's transfer plan. When the data for the file is uploaded by the client 103 to their respective segments in the postbox 105 of the server 101, the data will be expected by the server 101 to be in the compressed and/or encrypted format, as specified by the client during an initial file transfer setup. Once the data crosses the compression layer 107 and/or the encryption layer 109, the server 101 decrypts and/or decompresses the data.

3. Endpoint Layer

The endpoint layer 111 is the endpoint layer present in the server. The endpoint layer is a dynamic layer created or exposed on request of the client's plan. This can be any supported file sharing protocol offered under names and trademarks such as FTP, FTPS, SFTP, HTTP, HTTPS, SMB, Cloud Endpoints, etc. In one or more embodiments, these may be, for example, opened as simple server sockets.

4. Interaction Between Layers at Server Side

FIG. 2 illustrates interaction between layers at the server side. In FIG. 2, a server 201 includes postbox metadata 203, a postbox layer 205, and a compression layer 209. Actual storage 225 is provided.

The postbox metadata 203 specifies parameters for the file which is being transferred: file name, file size, file path to be stored in the server, predetermined segment size for data segments of the file, number of segments for this file which is being transferred, an aggregation technique to use to aggregate the segments, a trigger for initiating aggregation of the segments, one or more endpoint protocols to use to transfer the entire file, the encryption technique (if any) to use on the file, and a maximum expected time for the file transfer (here, 10 days).

The server 201 receives one or more files as data uploading from clients 1 to N 217, 219, 221. The data are uploaded based on the available application layer protocols 215 specified in the endpoint layer 223, according to one or more of the endpoint protocol(s) for the file which are specified in the postbox metadata 203. Typically, the data is the file which is uploaded in segments. The actual storage 225 are actual locations where the file should be, or has been, uploaded to, by the application layer protocol 215. The actual storage 225 can include, for example, a local directory 227, external remote servers 229 (FTPs/SFTP/HTTPs), and/or a network drive 231.

The endpoint layer 213 specifies one or more available application layer protocols 215, for example, SMB, HTTP/s, FTP/s, SFTP, and/or others, to use for receipt of the data. The endpoint layer 223 can specify one or more predefined encryption keys 213 according to available encryption techniques, for example, RSA-DSA keys, AES DES Keys, and/or others, to use for decryption of the data which is received.

The compression layer 209 specifies one or more available compression techniques, such as CODECS, ZIP, GZIP, and/or others. The compression layer 209 acts on the data on the fly (as the data is received) by compressing/decompressing the data to the agreed format according to the transfer plan, and/or decrypting the data as the data is received according to the encryption keys 213.

Once a file, or a segment thereof, has been uploaded, either to the actual storage 225 or to a temporary working location, the file or the segment thereof can be decompressed and/or decrypted by the compression layer 209, according to the encryption technique for the file, which is specified in the postbox metadata 203.

The postbox layer 205 specifies segment locations of segment 1 to segment N 207 of the file which is being uploaded. Each of the segment locations 207 in the postbox layer 205 is a virtual entity which internally points to the physical server (such as in the actual storage 225) where the segment is located. The predetermined size of a segment of the file which is being uploaded are specified in the postbox metadata 203.

C. Client Side

Referring to FIG. 1, 6 the client 103 includes endpoints 113, and postbox references 115.

1. Postbox References

A postbox reference is the postbox specific layer; the post box reference can be implemented to be usable and re-usable by any client, with any process, any operating system, any machine, any geographic location, any session, which are available to the client; and to have a specific postbox address wrapper and then do the file transfer. The postbox specific wrapper contains the address to the specific segment of the postbox. The postbox references can include one or more postbox specific layers such as a single process 117a, multiple processes 117b, multiple channels 117c, different sessions 117d, multiple geographic locations 117e, different machines 117f, different operating systems 117g, different timings 117h, different encryptions 117i, and/or different authentication 117j.

D. Common Component

Network Analyzer

The network analyzer is a sampling component, which maintains the network baselining of the network. The network analyzer is deployed both on the server and client component. The network analyzer may grow and can become more prominent with more data fed in to it.

The network analyzer can include three basis aspects.

1. Data Preparation: Collect the Raw data for the parameters. FIG. 6 (Baseline Table—Raw Data) provides an example.

2. Data Modelling: Create a model data, for example ranging from 1 to 10, 1 being the best preferred and 10 being the least preferred. FIG. 8 (Baseline Table—Model Data) provides an example.

Figure 14:
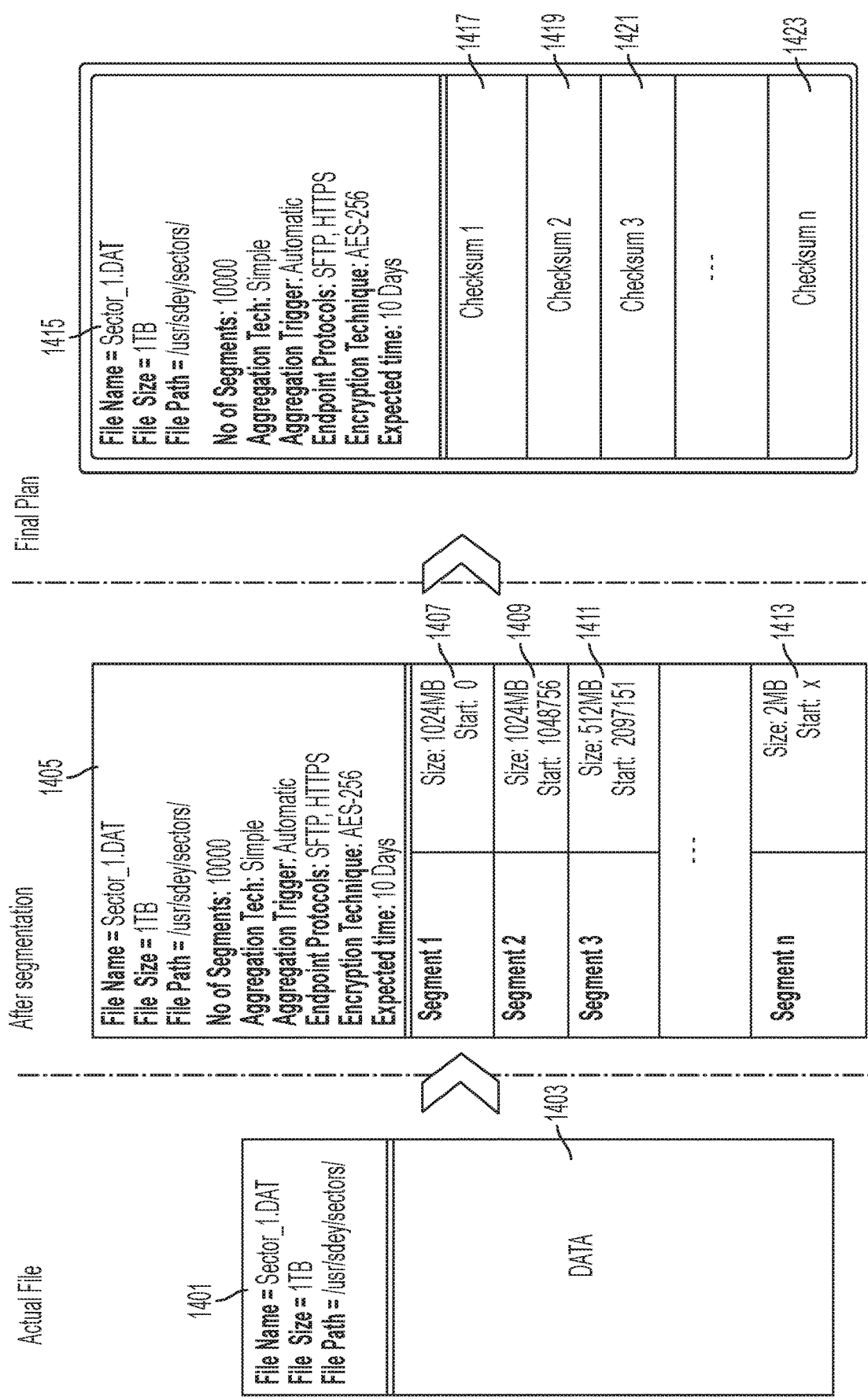
FIG. 14 illustrates a data flow of an example file.

3. Planning: From the model, generate the best suitable plan for the upload. FIG. 14 provides an example.

The network analyzer is discussed in more detail below, in connection with FIG. 6 to FIG. 15.

E. Implementation

Figure 3:
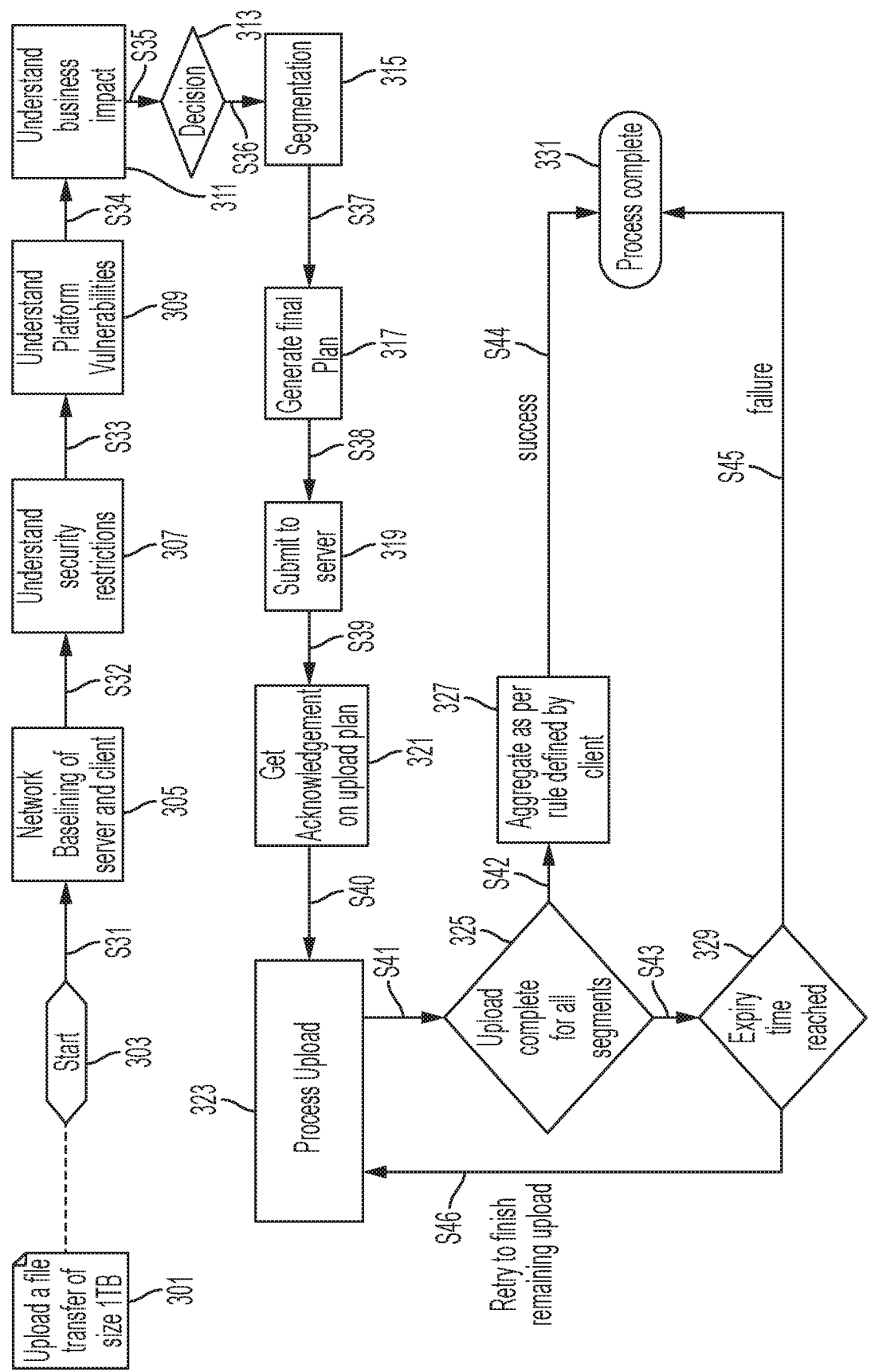
FIG. 3 is a flow diagram illustrating a diversified file transfer.
Figure 4:
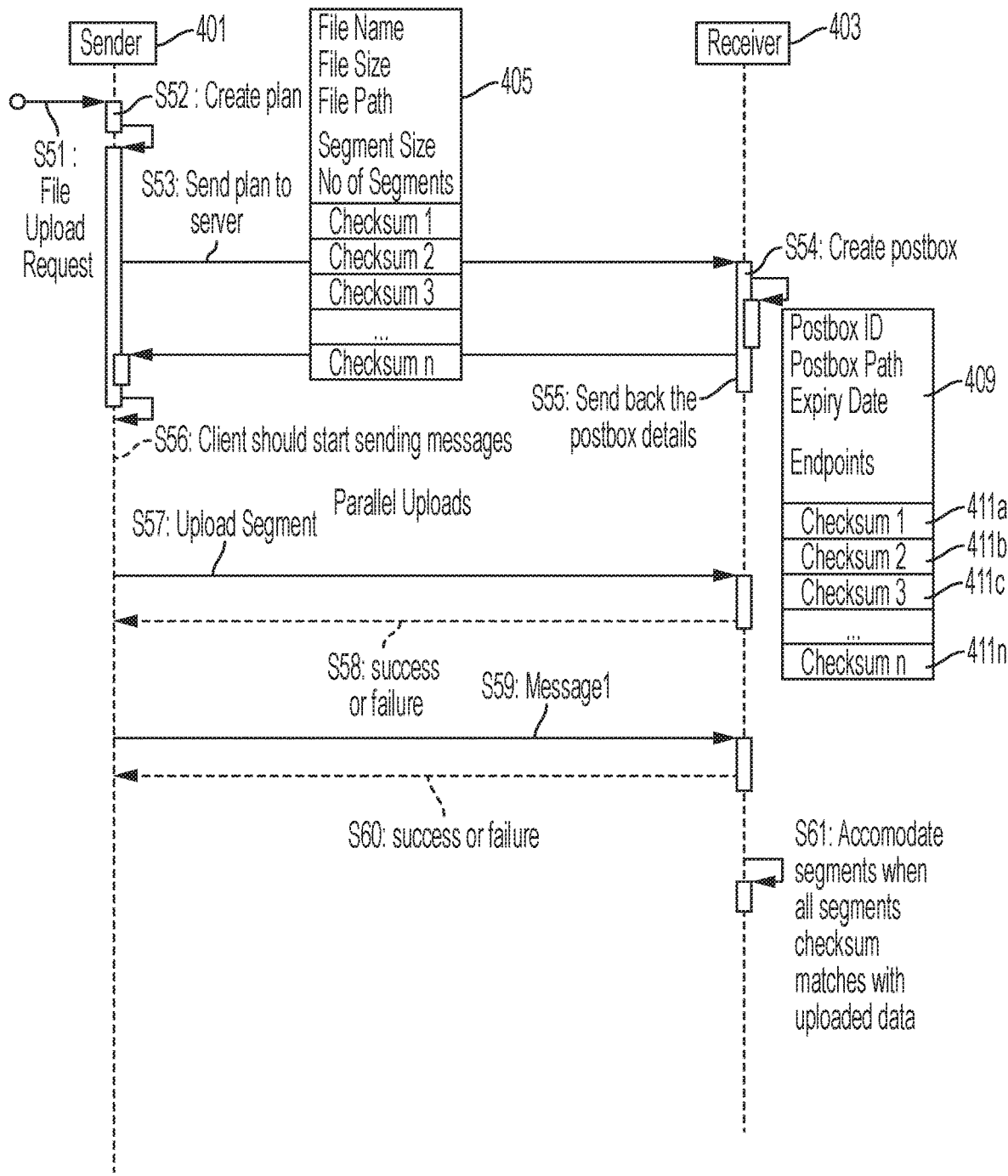
FIG. 4 is an interaction sequence diagram example of a diversified file transfer.

FIG. 3 illustrates an example implementation under the basic approach the client and server come to agreement over the best suited plan as per their environment conditions, for completing a file transfer.

In the example of FIG. 3, a user on a client wishes to upload 301 a file transfer of 1 TB size. The client starts 303 the file transfer.

Step S31 initiates network baselining 305, using the network analyzer. Network baselining is the act of measuring and rating the performance of a network in real-time situations. Techniques are known for conducting network baselining. The network baseline is performed using testing and reporting of the physical connectivity, normal network utilization, protocol usage, peak network utilization, and/or average throughput of the network usage. The reports of physical connectivity, normal network utilization, protocol usage, peak network utilization, and/or average throughput, resulting from the network baselining will be used to determine the efficient window time(s), protocols, and physical connections for the transfer plan for the file transfer operation.

Step S32 begins a process of understanding security restrictions. The network analyzer can check if there is any network level security, such as proxies, firewall(s), intrusion prevention measures, web filtering, etc. enabled. Security checks slow down file transfer speed significantly. As most security restrictions are used to detect and restrict traffic to/from an untrusted network, the network analyzer can plan an exclusion of any trusted server. That is, the intended target server, which is a trusted server, for the upload may be excluded for the network traffic security checks.

There may be two ways to plan the exclusion—using an automated method, or proxy exclusion rules. The automated method will leave it to the Network Analyzer to analyze the network conditions to figure out the best suited time period for the upload to take place. This means that the system actually does not (need to) exclude the target server from the security checks, yet the system goes ahead with the resulting analyzed best time slots to suggest within the upload plan later on.

The proxy exclusion rules, if used, will exclude the trusted server from a list of targets being checked. This will enhance the results of Network Analyzer for a suggestion of a best suited time period for the upload to take place. In general, using conventional techniques, the specific proxy— URLs, port numbers, etc. —can be configured to exclude these targets from the security checks. This will enhance the results of the Network Analyzer for the suggestion.

Step S33 begins a process of understanding 309 platform vulnerabilities, which will check if there is any platform level component(s) like proxies, cache servers, and/or monitoring servers, etc. enabled. This type of address translation, caching, monitoring, and/or sniffing slows down transfer speed significantly. As most of these functions are used to detect traffic to an untrusted network, the trusted server can be planned for exclusion.

A cache server is a dedicated network server or service acting as a server that saves Web pages or other Internet content locally. By placing previously requested information in temporary storage, or cache, a cache server both speeds up access to data and reduces demand on an enterprise's bandwidth. But in this case the file is a unique segmented file which will not be reused by anybody, so caching does not speed the file transfer process. Moreover, having a mechanism to cache at every upload of chunk certainly delays the complete upload process.

A proxy server or a monitoring server acts as a gateway between a user and the internet. It is an intermediary server separating end users from the websites they browse. Proxy servers provide varying levels of functionality, security, and privacy depending on the use case, needs, or company policy.

So all the data to be uploaded conventionally is subjected to extra levels of security, privacy and throttling conditions. With the technique disclosed herein, the usual additional scrutiny of security and platform vulnerabilities is not be required because the destination server is very well known. In addition, because the intense upload is carried out at a trough network usage time, the throttling conditions are not necessary.

Step S34 begins a process of understanding 311 the business impact. Some ISP or service providers promote time slots by providing a huge monetary discount on network usage at particular time slots, and/or provide time slots which offer a huge difference in speed, to encourage the user to transfer large file chunks during these time slots. These promoted time slots should be considered in the transfer plan.

Step S35 begins a decision 313 as to time slots/conditions, and security/throttling/vulnerabilities protocols to be bypassed. Based on the understanding of network baselining 305, security restrictions 307, and platform vulnerabilities and limitations 309, a suitable transfer plan can be determined which can enable the user to complete its upload in a smoother way. The system can determine which time slots or conditions will be best suited for the proposed file transfer, and where the system can carry out parallel segment uploads, in the desired protocols bypassing unrequired or unnecessary security checks, packet sniffing, throttling, and the like.

Step S36 begins a process of data segmentation 315, in which the file to be transferred is segmented into data segments. Based on the duration between network failures obtained from network baselining, an optimum segment size which is less likely to experience network failure is determined, optionally in association with time slots. The complete file can be segmented into data segments of planned chunk sizes, which may be predetermined even or uneven sizes, based on the optimum segment size, and a data integrity value can be created for the segments. (Techniques for generating a data integrity value are known; a common example of a data integrity value is a checksum or similar which enables a simple determination that the data has not been changed.) The data segmentation process is explained in additional detail herein. In general, techniques for segmenting a file are available. Some implementations will include encryption and/or compression, which may be prior to and/or or subsequent to segmentation, prior to the upload process 323. Techniques for encryption and compression are available.

Step S37 begins a process of generating 317 a final plan for transferring the file. The transfer plan may be implemented as a file or as data attached to a file, for example, file metadata as presented herein. The file metadata having a name of the file, a path where the file is to be stored in server, a size of the file, a number of segments of the file, aggregation technique for aggregating the segments, aggregation trigger for initiating the aggregation, protocol endpoints for transferring the segments, encryption technique, and an expiry date (which may be a duration) for completion of the file transfer, along with the segment checksum, is generated.

Step S38 begins a process of submitting 319 the transfer plan to a server. The customized transfer plan is sent by the client to the server. The transmission to the server may be part of an instruction to perform a file transfer, or an instruction to plan a file transfer.

Step S39 begins a process of the client receiving an acknowledgement of the uploaded plan. Once the server receives the transfer plan, the server then verifies the plan to ensure that at least a minimal part of the transfer plan is possible at the server. If the plan is verified, the server creates a postbox area in a persistent storage with an expiry date. The server generates a postbox id, and using known techniques shares its persistent storage with the requested protocol endpoints. The server then shares or transmits to the client an acknowledgement which contains the requested endpoints which were verified.

Step S40 begins a process to upload 323 the file pursuant to the transfer plan, which has been requested by the client and verified by the server. The client then connects to the server according to the verified, requested endpoints in the acknowledgement of the transfer plan, and the client completes a transfer of each segment one by one over the verified, requested endpoints. Note that the transfer plan may specify different time slots, processes, channels, sessions, machines, encryptions, and/or authentication processes; an upload of segments within the file may be performed according to one or more combinations thereof specified in the transfer plan.

Step S41 checks 325 whether the upload is complete for all segments of the file.

If the upload is complete for all segments, step S42 begins to aggregate 327 the segments as per the rule defined by the client in the transfer file. If the aggregation trigger is set to automatic, the server automatically checks if all the segments are completed with the assigned checksum specified in the transfer file. If the server finds all the segments of the file are completed, it triggers the aggregation process, which may be specified in the transfer file, where the server aggregates all the segments mentioned in the aggregation technique. Aggregation processes are known.

If the aggregation trigger is not set to automatic, the aggregation process may be initiated when it is triggered by the client.

At Step S44, the file transfer process is completed 331 and successful.

If the upload is not complete for all segments, Step S43 determines whether the expiry time is reached 329, and at step S46 will look to retry the upload for remaining segments if the expiry time is not yet reached. The segments may be uploaded in any order. If the segments are not uploaded with in the specified expiry time, the server expires the post box which was created. If the server finds any of the checksum not matching, it deletes the segment, allowing the client to try again.

If the expiry time is reached 329, at step S45 the process completes 331 with a timeout failure status.

FIG. 4 is an interaction sequence diagram. The sequence includes a sender 401 and a receiver 403. The sender 401 corresponds to the client which transfers a file; the receiver 403 corresponds to the server to which the file is transferred.

At Step S51, a file upload request at the sender 401, to upload a file from the sender 401 to the receiver 403, initiates the interaction sequence. At step S53, the sender 401 creates a transfer plan 405 which includes a file name, file size, file path for the file at the receiver 401, segment size, number of segments, and checksums 1 through n. Techniques for creating the transfer plan 405 are discussed elsewhere herein. At step S53, the sender 401 sends the transfer plan to the server 403.

At Step S54, the receiver 403 creates a postbox 409 for the file which is to be transferred. The postbox 409 includes a postbox ID, postbox path, expiry date, verified endpoints, and checksums 1 to n 411a to 411n. The postbox is discussed elsewhere herein in more detail.

At Step S55, the receiver 403 sends the transfer plan acknowledgement to the sender 401. The transfer plan acknowledgement includes postbox details 409 including the postbox ID, postbox path, expiry date, verified endpoints, and checksums.

Now that the receiver 403 has verified and agreed to the transfer plan 405 of the sender 401 and has supplied the transfer plan acknowledgement with the remaining details for the transfer, the transfer of the file may commence.

At Step S56, the sender 401 should begin sending messages with the file, which may be segmented. Prior to transferring each data segment, and preferably prior to creating the transfer plan, the file has been segmented into data segments. The uploads of data segments may be performed in parallel, and/or may be performed sequentially. In the following, a representative file is segmented into two data segments; however, in practice, a file may be in any number of data segments, and/or might not be segmented.

At Step S57, the sender 401 uploads a first data segment to the receiver 403 through the verified endpoints specified in the postbox 409; the receiver 403 then verifies the data using, e.g., the checksum for the data segment. At Step S58, the receiver 403 notifies the sender 401 of the success or failure of the upload of the first data segment.

The steps S57 and S58 are repeated for each of the data segments. Thus, at Step S59, the sender 401 uploads a next data segment to the receiver 403 through the verified endpoints specified in the postbox 409; the receiver 403 then verifies the data using, e.g., the checksum for the data segment. At Step S60, the receiver 403 notifies the sender 401 of the success or failure of the upload of the next data segment.

The upload steps are repeated for each data segment which has not been successfully transferred, although at the expiry date the postbox 409 expires and the receiver 403 may thereafter not accept more data segments for the postbox.

At step S61, once all checksums have been matched to uploaded data segments, the file transfer may be deemed complete. In the illustrated example, it is unnecessary for the receiver 403 to expressly acknowledge receipt of the complete file, because the receiver 403 notifies the sender 401 as to successful receipt of each data segment.

It will be appreciated that, once the receiver 403 (or server) acknowledges the file transfer plan, possibly with adjustments to the available time slots, the receiver 403 (or server) communicates S55 the postbox details which indicates the locations where the file segments need to be uploaded. The sender 401 (client) can plan its executions across different machines and geographic locations. Because the complete huge file to be transferred is broken down into multiple file upload tasks (e.g., different file transfer sessions of different data segments), the overall file transfer may be executed sequentially or parallel in one computer, or can be distributed across multiple computers such that data segments for a single file to be transferred are uploaded to a single machine, or different machines or different computers. This may provide a horizontal scaling for file transfer processing. The multiple machines/computers may be physically in different (or the same) geographic locations. For example, the file transfer may be planned to incorporate different data centers which have a copy of the data to be transferred or which has been transferred.

Figure 5:
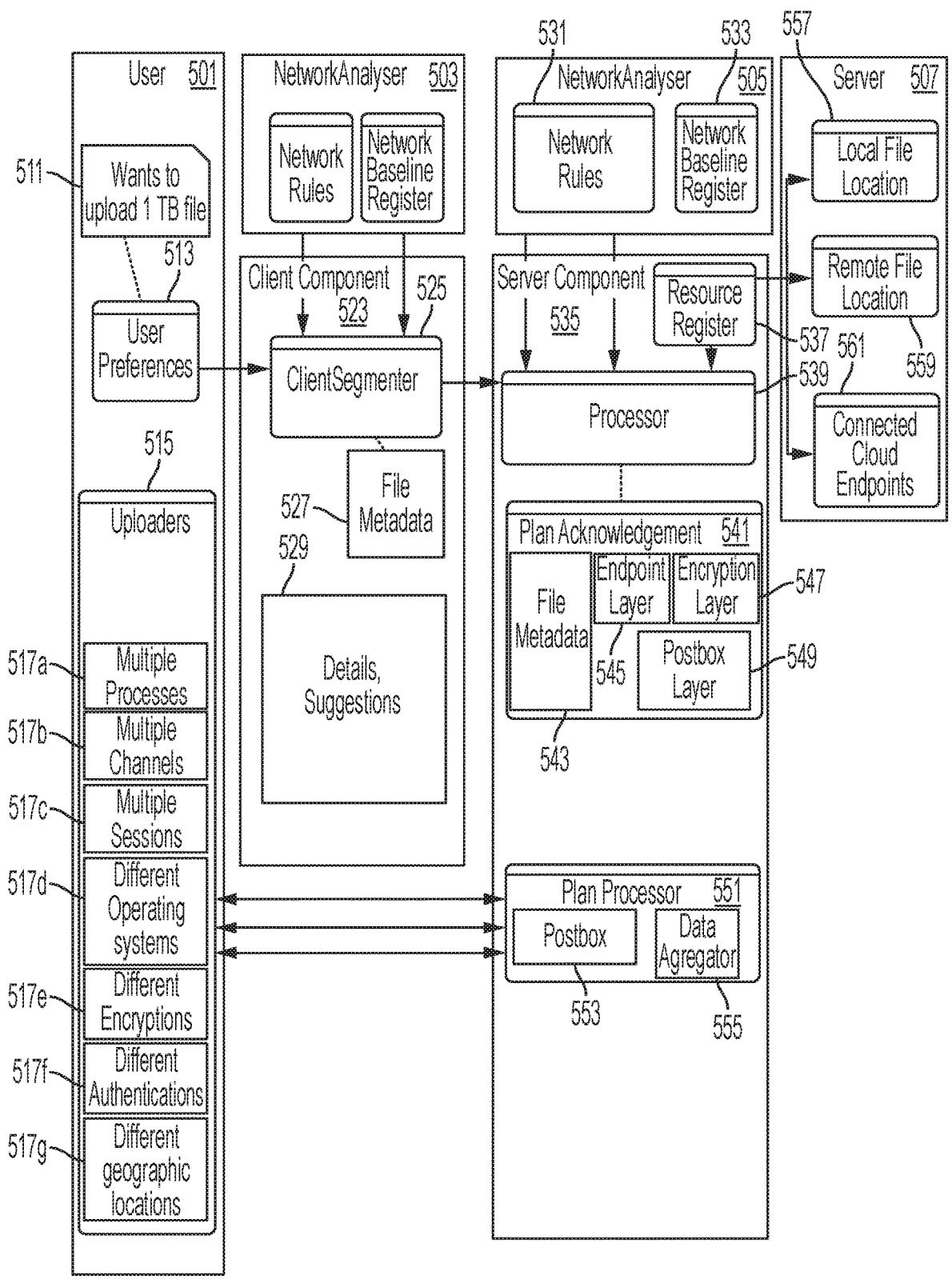
FIG. 5 is a block diagram illustrating example functional flows.

FIG. 5 is a combined functional block and data flow drawing which illustrates an example of the concept. FIG. 5 illustrates a user at a client 501, a server 507, a network analyzer 503 at the client 501 side, and a network analyzer 505 at the server 507 side.

The client 501 has different ways to upload files 515, hereafter, "upload features". The upload features may include, for example, multiple processes 517a, multiple channels 517b, multiple sessions 517c, different operating systems 517d, different encryptions 517e, different authentication 517f, and/or different geographic locations. An upload of segments of a single file may be performed using different upload features, for example, using different encryptions 517e over multiple sessions 517c. A file transfer "session" is understood by one of skill to refer to one session while a particular server port and particular client port are connected according to a particular file transfer protocol, for transferring a part of a file; a session is understood to have a predetermined sequence (e.g., password, etc.) to begin. According to the disclosure herein, a "session" attempts to transfer a data segment between a selected server endpoint and client endpoint, using a selected file transfer process, as specified in the final transfer plan.

A user at the client 501 initiates an upload of a file; in this example, the file is 1 TB. The client 501 prepares user preferences 513 which may be input by the user, such as 1. authentication mechanism, 2. encryption mechanism, 3. protocol, 4. data segmentation technique, and/or 5. data aggregation technique.

The network analyzer 503 at the client 501 side may include network rules and a network baseline register of the client 501, which have been discovered using known techniques. The network analyzer 505 at the server 507 side may include network rules and a network baseline register of the server 505, which also may be discovered using known techniques. Network rules can include, for example, 1. security restrictions, 2. platform vulnerabilities, 3. throttling rules, and/or 4. banning rules, discussed above. The network baseline register can include, for example, 1. network fluctuations, 2. network utilization, 3. protocol usage, and/or 4. network throughput, also discussed above.

The client 501 includes a client component 523. The client component 525 includes a client segmenter 525. Based on inputs from the network baseline register, the network rules, and the user preferences, the client segmenter 525 determines segments into which the file is to be segmented, generates a transfer plan 527 for the file to be transferred, and sends the transfer plan to the server 507. The transfer plan 527 specifies file name, file size, a path where the file is to be stored in server, a size of data segments in the file, a number of segments of the file, an aggregation technique for aggregating the segments, an aggregation trigger for initiating the aggregation, protocol of endpoints for transferring the segments (for example, FTPS, FSTP, HTTPS), an encryption technique for encrypting/decrypting the segments (e.g., AES-256), and an expiry date (for example, 10 days) for completion of the file transfer.

The client component 523 can include details and/or suggestions 529 of the transfer, as illustrated in the following code segment:

{
"Plan acknowledgement Details": . . . ,
"suggestions":
 {"date-range":"22-25 Jan", "time-range": "08.00-18.00", "parallel-upload" 2,
  "endpoint": "FTPS://server1:2319",
  "preference":6
 },
 {"date-range":"22-25 Jan","time-range":"18.00-8.00 (Next Day), "parallel-upload" 10,
  "endpoint":"FTPS://server1:2319",
  "preference":6
 },
 {"date-range":"26-27 Jan","time-range":"00.00-8.00 (Next Day), "parallel-upload" 20,
  "endpoint":"FTPS://server1:2319",
  "preference":10
 },
 {"date-range":"28-31 Jan","time-range":"08.00-18.00, "parallel-upload" 2,
  "endpoint":"FTPS://server1:2319",
  "preference":2
 },
 {"date-range":"28-31 Jan","time-range":"18.00-8.00 (Next Day), "parallel-upload" 10,
  "endpoint":"FTPS://server1:2319",
  "preference":6
 }
]

The server 507 can include a server component 535. The server component includes a resource register 537, a processor 539, a plan acknowledgement 541, and a plan processor 551. The resource register 537 can specify 1. a reference to the actual location for the file to be transferred, 2. supported authentication mechanisms, 3. supported encryption techniques, and/or 4. supported protocols, which are supported by the server 507.

The plan acknowledgement 541 can include file metadata 543, endpoint layers 545, the encryption layer 547, and the postbox layer 549; these are discussed elsewhere in detail. File metadata 543 is specific to a particular transfer of a file, and specifies file name, file size, a path where the file is to be stored in server, a size of data segments in the file, a number of segments of the file, an aggregation technique for aggregating the segments, an aggregation trigger for initiating the aggregation, the postbox ID associated with this transfer plan, and an expiry date for the postbox. The endpoint layers 545 can specify, for example, endpoints at the server and their associated transfer protocols, for example, FTPS://server 1:2319, SFTP://server 3:2322, and HTTPS: N/A. The encryption layer 547 can specify the kind of encryption to use for this file, for example, AES-256 (many other kinds of encryption are available and may be used). The postbox layer 549 specifies the location of each segment of the file being transferred, for example:

/VSF_LOCAL_1097/SDEY/SEGMENT_0001
/VSF_LOCAL_1097/SDEY/SEGMENT_0002
/VSF_LOCAL_1097/SDEY/SEGMENT_0003 . . .
/VSF_LOCAL_1097/SDEY/SEGMENT_1000

The plan processor 551 can include a postbox 553 and a data aggregator 555.

Based on inputs from the network rules 531, the network baseline register 533, and the user preferences, the processor 539 generates the postbox layer, encryption/compression layer, and endpoint layer, and responds back to the client with the confirmed information in a plan acknowledgement 541. The processor 539 is created, and receives and handles the data until the expiry time.

The server 507 includes a local file location 557, a remote file location 559, and/or connected cloud endpoints. An example of connected cloud endpoints is, e.g., Aure, and/or AWS. An example of a local file location 557 is: /home/user/sdey/ and /mnt/resource/user/sdey/.

An example of a remote file location 559 specifies:
FTP://ftp.softwareag.com/user/sdey/
FTPS://ftp.softwareag.com/user/sdey/
SFTP://sftp.softwareag.com/user/sdey/
SMB://banfiler01.eur.ad.sag/username/

F. Network Analyzer

The network analyzer may be a sampling component, which maintains the network baselining of the network. The network analyzer may be deployed on the server component for server data, on the client component for client data, and/or on both on the server and client components for server data and client data respectively. The network analyzer may grow and becomes more prominent as more data is fed in to it over the course of time.

The network analyzer can include three basic steps:

1. Data Preparation: Collect the Raw data for the parameters as shown on the below table.

2. Data Modelling: Create a model data ranging in a predefined data modeling scale, for example from 1 to 10, 1 being the best preferred and 10 being the least preferred.

3. Planning/Decision Making: The input from the Network analyzer is used to plan at both client side and server side.

Each of these three is discussed in more detail in the next sections.

The parameters are mentioned in Table 1.

TABLE 1

| | Parameters | |
|---|---|---|
| Throughput of the channels | TCP UDP | The table may maintain a channel throughput ledger of average data transferred. The average data transferred by a channel may be rated, for example between 1 to 10 witht he higher value indicating high throughput in the network, and a lower value indicating less usage or throughput. Lesser throughput gives room for other transfers to carry out their operations, thereby utilizing the bandwidth to the maximum. |
| Remote endpoint | HTTP/s FTP/s SFTP Others | The table may maintain a remote endpoint ledger of average data transferred, failure rates and stability classified across different endpoints. The average data transferred may be rated, for example between 1 to 10, a higher value indicates unstable and less preferred; a lower value indicates the stability is high with less failure rates and fluctuations. Lesser value helps in determining which channel or endpoint to prefer over others. |
| Performance | Packet size < 512 KB Packet size >= 512 KB | The table can maintain a performance ledger of the network delays, packet drops buffer underflow and overflow scenarios. Performance for packet size may be rated, for example, between 1 to 10; a lesser value indicates better performance areas. |
| Congestion | Response time Queuing Delay Packet loss | The table can maintain a congestion ledger of the response time, queuing delays and packet loss scenarios. Congestion may be rated, for example, between 1 to 10; a lesser value indicates better performance areas |

1. Data Preparation

An example application of the baseline table of Table 1 is provided in FIG. 6A to FIG. 6B (collectively, FIG. 6). The Baseline Table—Raw Data of FIG. 6 illustrates the calculations based on the raw data, wherein the values are collected during system operation or the client or server on which the network analyzer baselining is deployed, and the collected values are averaged as they are collected; the baseline table of raw data gets stronger and more effective as and when it grows.

In the Baseline Table 600 of Raw Data, data is collected for each of the Table 1 parameters, including the type of parameter 601: throughput of the channels, remote endpoint, performance, and congestion; parameter category 603 such as TCP/UDP; HTTPs, FTPs, SFTP; packet size; response time, queuing delay, and packet loss; each of these can be subdivided 605 to reflect inbound, outbound, peer-to-peer, and the like. The raw data is split into "busy day" and "non-busy day" for a meaningful distinction, and then averaged over time slots 607 to 617 for the busy day and non-busy day.

The calculated Raw Data in the table of FIG. 6A/FIG. 6B may be maintained in the table and constantly updated and averaged as new data is collected according to the following example calculation:

Averaged Value=(sum of all existing values+New Value/(Number of existing records+1)

Whether a day is a busy day or a non-busy day may be determined based on the amount of usage according to the calculated raw data table. FIG. 7 illustrates an example day usage table 700, where each day of the week 701 is associated with a weighted average 703.

2. Data Modelling

From the calculated raw data, as in FIG. 6, a model is created with values in a predetermined scale, in this example, ranging from 1 to 10. FIG. 8A to FIG. 8B (collectively, FIG. 8) illustrates an example baseline table with model data.

In this model, values are used to calculate the preference of the specific parameter.

The follow is an example formula to scale the numbers between 1 and 10:

$$\text{Normalized Value} = ((9*(\text{Current Value} - \text{Minimum (Present list)}))/(\text{Maximum (Present list)} - \text{Minimum(Present list)})) + 1$$

where
- Minimum possible Value (MinV)=Minimum possible value for the parameter.
- Maximum possible Value (MaxV)=Maximum possible value for the parameter.
- Add MinV and MaxV to the list.

In the Baseline Table 800 of Model Data, the calculated raw data has been scaled for each of the calculated Baseline Table—Raw Data parameters, including the type of parameter 801, parameter category 803; subcategory 805 (reflect inbound, outbound, peer-to-peer, and the like); the calculated raw values are scaled for the time slots 807 to 817 for a "busy day" and a "non-busy day". In this example, the time slots are 8:00 to 16:00, 16:00 to 00:00, and 00:00 to 08:00. Other examples may use different time slots.

FIG. 9 illustrates a day usage table based on FIG. 8A to FIG. 8B, which identifies each day as either a busy day or a non-busy day. Based on the behavior on the daily basis, the day is stated to be busy if the weighted average is greater than a pre-determined busy value, in this example the "busy value" is 4, else stated to be a Non busy day.

C. Planning on Client Side

FIG. 10 is a table 1000 with modelled data for determining the weighted average for each of the Table 1 parameters 1001, based on the modeled data of FIG. 8. For each of the Table 1 parameters 1001, weighted averages across all time slots are calculated from the modeled data. In particular, for each of the parameters (channel throughput, remote endpoint, performance, congestion), points 1003 and weightage 1005 are determined, and then a weighted point 1007 is determined based on the points 1003 and weightage 1005. A total of the weighted points 1007 can be calculated.

FIG. 11 is a weighted average table 1100 illustrating the weighted average 1101 of the time slots 1103 to 1113 for a busy day and a non-busy day based on the model data of FIG. 8.

For the following calculations, note these definitions.
- $T_u$=Time taken for a segment to be uploaded
- $T_r$=Total time in the range
- $Sp_{avg}$=Average speed for the scenario from baseline raw data table
- $Sz_{Segment}$=Segment Size based on weighted average
- $R_t$=Response time for the time range from model data
- $D_{pkt}$=Packet delay for the range from model data
- $L_{pkt}$=Loss in Packet from model data
- $T_{stable}$=Stable time for a time range
- $T_h$=Average available throughput for the scenario from baseline raw data table The weighted average generated across timelines is used for
1. Time slot suggestion (discussed further below)
2. Data Segmentation process (also discussed further below)

Time Slot Suggestion

From the above weighted average chart
1. Date-range:

Day usage table from the modelling process is used to classify the available date range in to busy and non-busy days.

2. Time-Range/Preference:

From the weighted average calculated above, the time ranges are sorted in ascending order. With the first one with low preference.

3. Parallel upload:

From the weighted average calculated above for each time range value based on the chart $$T_u = Sz_{Segment}/Sp_{avg}$$

Number of Slots for a range=$T_r/T_u$
Number of parallel uploads=$T_h/Sp_{avg}$

4. End point:

Based on the model data the remote endpoint having lowest values, which are among the accepted list by server also are suggested to the end user.

Best slots as per the upload size may be determined based on the weighted average, as illustrated for example in FIG. 12. In FIG. 12, the time slots 1201 are determined from the date range 1203, the time range 1205, the calculated amount parallel uploads 1207, the end point 1209 at this side (the server or client) for the upload, and the calculated preference 1211.

Data Segmentation Process

Based on the network failures obtained from network baselining, the complete file will be segmented into planned chunks, which may have an uneven size, and a checksum is created for each of the segments.

The output of the process is a plan, with which the client will diversify the file transfer.

An example process to create the segmentation follows.

From the weighted average calculated above, the segment size can be determined by, for example, the following process:

$T_{max}$=Max time segment is defaulted to a predetermined duration, for example, 10 minutes; according to some embodiments the Max time segment is altered based on network situations.

$$T_{stable} = T_{max}/(\text{Average}(R_t + D_{pkt} + L_{pkt}))$$

$$\text{Actual size}(A_z) = (Sp_{avg} * T_{stable} * 60)$$

$$Sz_{Segment} = 2^{(\log(Az)/\log(2))}$$

The entirety of the data may then be chunked based on the segment sizes obtained from the above formula.

FIG. 13 illustrates the data segments based on FIG. 10-12. In FIG. 13, a segment table 1300 specifies each segment 1301, and for each segment the segment table specifies a segment size 1303 and the checksum 1305 which was determined for the segment.

FIG. 14 illustrates a data flow including the transfer plan 1401 and actual data 1403 before segmentation, the transfer plan 1405 and actual data 1407 to 1413 after segmentation, and the final transfer plan 1415 with the checksums 1417 to 1423 for the segments.

Prior to segmentation, the transfer plan 1401 includes the file name, file size and file path; the data 1403 to be segmented (the file itself) is stored in a memory. These are located on the client side.

Then, the data 1403 is segmented into segments 1407 to 1413, which may be the same size or may be different sizes, depending on the expected duration for the segment, as discussed above. The file name, file size, and file path in the post-segmentation transfer plan 1405 remain the same after segmentation. The number of segments is added to the transfer plan after segmentation. Also added to the post-segmentation transfer plan 1405 are the endpoint protocols of the client side, the aggregation technique and aggregation trigger assigned by the client side, the encryption technique requested by the client side, and the maximum time duration for the transfer requested by the client side.

Then, the final transfer plan 1415 is generated from the post-segmentation transfer plan 1405. The final transfer plan 1415 specifies the checksum 1417 to 1423 which is calculated for each segment that is to be transferred. The final transfer plan 1415 is sent from the client to the server, as previously explained, to obtain an acknowledgement of the final transfer plan, such as the requested endpoint protocols, aggregation technique, aggregation trigger, and expected rotation, and to assign the server-side endpoints.

The final transfer plan 1415 will have file metadata having name of file, path to be stored in server, size of the file, number of segments, aggregation technique, aggregation trigger, protocol endpoints, encryption technique, and an expiry date, along with the segment checksum which is generated, so as to identify the file and provide a plan as to how to aggregate and decrypt the segments and verify data integrity within a predetermined time/date limit.

G. Decision Making and Processing at Server Side

Based on inputs from network analyzer, and the plan preferences in the final transfer plan 1415, the server side generates the postbox layer, encryption/compression layer and endpoint layer and responds back to the client.

In the server a process is created, which receives and handles the data till the expiry time specified in the final transfer plan.

This is the component at the server, which receives the plan from the client and then creates the following operations:

Plan Acknowledgement

The server side verifies the feasibility of the plan, by referring to its Network Analyzer component, present at the server side. The acknowledgement is done based on the below parameters:

1. Endpoint/Encryption Layer

Based on the weighted average from the network analyzer model, the best performing endpoints which are also matching with the client's request stated in the final transfer plan 1415 are allowed by the server.

Here the server analyzes the endpoints, authentication strategies and encryption strategies requested by the client and figures out the gap, if any, it has between the available resources and demanded resources.

After the analysis, the server creates the endpoint layer and the encryption layer.

The Endpoint Layer exposes the server by opening TCP layer ports as demanded by the client in the final transfer plan 1415. The server wish to deny few TCP layer channels, if the request resource is not feasible. For example:

FTPS: //server1:2319
SFTP: //server3:2322
HTTPS: N/A

2. The Encryption Layer

On analyzing the client's request in the final transfer plan 1415, the server may find out that the client wishes to upload the content with a particular type of encryption. So in response the server prepares an encryption layer that receives the stream/content uploaded to it on the fly (as received) and decrypts the stream/content which is uploaded. Techniques are known for encryption and decryption. In the example of FIG. 14, the encryption/decryption technique is AES-256.

3. PostBox Area

The server then automatically creates a postbox area in a persistent storage with an expiry date based on the date specified in the final transfer plan 1415. Based on the weighted average from the network analyzer model, the expiry date can be elongated/shortened or honored as it is.

For example, if the requested time period by the plan coincides with the busy days of the server's network, then server might include a few non busy days. Reference is made to the day usage table 1500 of FIG. 15. In FIG. 15, the day usage table lists a date-range 1501, a time-range 1503, a day 1505, and a weighted average 1507. In this example, assume that the client has requested days which are busy days for the server (consequently, the server might not be able to complete the plan using those busy days). Accordingly, the server proposes to extend the window for the transfer by adding days which are non-busy days for the server.

This postbox area at the server can be a local file system or a network or a set of network drives exposed through different protocols like SFTP, FTP, HTTP, SMB, WebDAV or any other cloud endpoints.

This postbox area will be segmented into the number of segments as requested by the client and separate handles to each segment will be exposed the client. For example, /POST_560037/VFS_LOCAL_1097/SEGMENT_0001
/POST_560037/VFS_LOCAL_1097/SEGMENT_0002
. . .
/POST_560037/VFS_LOCAL_1097/SEGMENT_1000

4. Resource Register

The resource register can be a one to one mapping of a resource id and its definition. Here the resource is referred to the actual physical location where the data is stored. The physical location can be a local file system, network drive or a remote server connected via standard protocols like (FTP/s, HTTP/s, SFTP, WebDAV, SMB, cloud endpoints).

The postbox mentioned in the previous example will be referenced to a resourceid(like:— VFS_LOCAL_1097), whose actual location can be obtained from the resource register (like: FTPS://sdey: manage@ftp.server.softwareag.us/usr/sdey/dir1097).

5. Data Aggregator

This is the aggregator component, which keeps a note of all uploads, and terms a segment upload as successful when the checksum matches the assigned one.

If it finds all the segments are completed, the aggregator component triggers the aggregation process, where it aggregates all the segments mentioned in the aggregation technique.

If the aggregation trigger is not set to automatic, the aggregation process is initiated when it is triggered by the client.

If the segments are not uploaded with in the specified expiry time, the server expires the post box created.

After the above processes are completed, the server generates a postbox id, and shares its persistent storage with the requested protocol endpoints. It then shares the acknowledgement of the final transfer request with the client; the acknowledgement includes endpoints at the server as well as any additional information created by the server (such as additional time slots), as well as removing any requests which are not accepted by the server (such as non-supported encryption, or other request).

IV. Additional Example Implementation(s)

This section will discuss additional concrete examples of implementations, further in accordance with exemplary embodiments.

Figure 16:
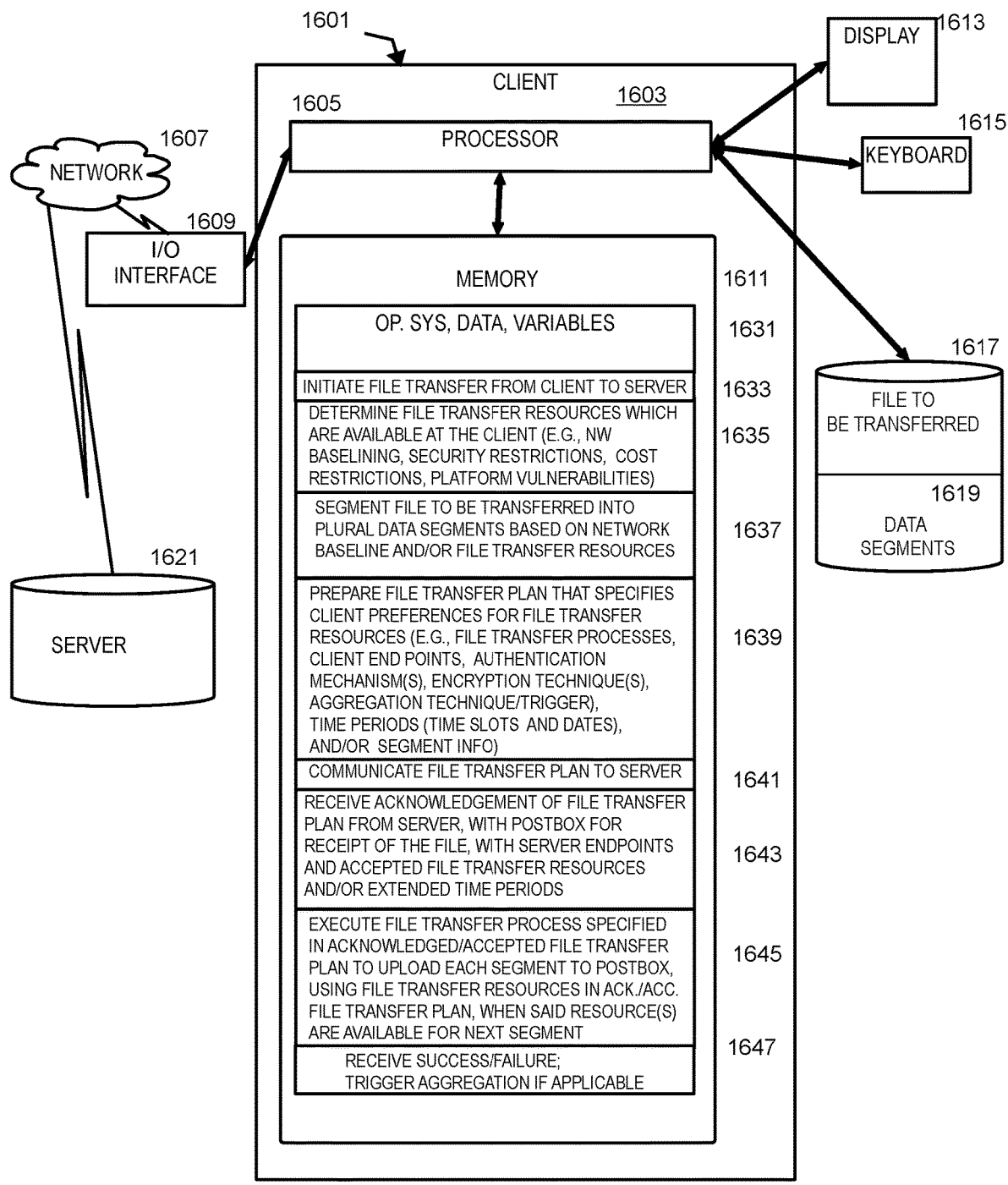
FIG. 16 is a block diagram illustrating portions of a client.
Figure 17:
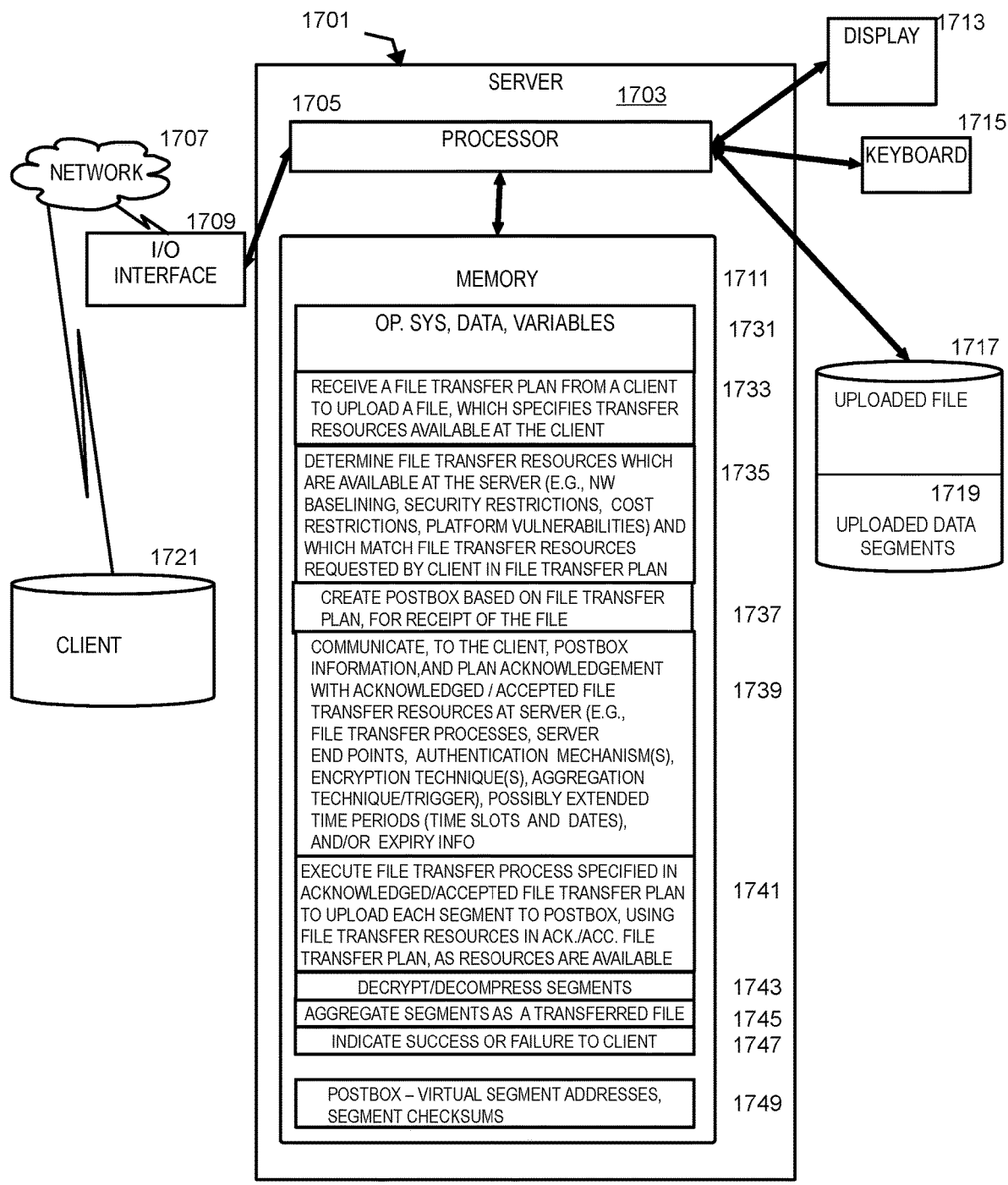
FIG. 17 is a block diagram illustrating portions of a server.

FIG. 16 is a block diagram illustrating portions of a system with diversified file transfer. FIG. 17 is a flow chart illustrating a diversified file transfer procedure.

FIG. 16 is a block diagram illustrating portions of a client supporting a file transfer which can be diversified. The client 1601 may include one or more controllers 1603, a processor 1605, an i/o interface 1609 for communication over a network 1607 with, e.g., a server 1621, a memory 1611, an optional display 1613, a storage for the file to be transferred 1617 and data segments 1619, and/or an optional user input device such as a keyboard 1615.

The processor 1605 may comprise one or more microprocessors and/or one or more digital signal processors. The memory 1611 may be coupled to the processor 1605 and may comprise a read-only memory (ROM), a random-access memory (RAM), a programmable ROM (PROM), and/or an electrically erasable read-only memory (EEPROM). The memory 1611 may include multiple memory locations for storing, among other things, an operating system, data and variables 1631 for programs executed by the processor 1605; executable computer program instructions for causing the processor 1605 to operate in connection with various functions such as to initiate 1633 a file transfer from the client 1601 to a server; to determine 1635 file transfer resources which are available at the client (for example, network baselining, security restrictions, cost restrictions, platform vulnerabilities, file transfer processes, compression, encryption, channels, etc.; to segment 1637 the file which is to be transferred into appropriately sized segments, including to determine segment size based on file transfer resources so as to avoid a failure on a segment; to prepare 1639 a file transfer plan that specifies client preferences and available file transfer resources which are available to the client (such as file transfer processes, client end points, authentication mechanism(s), encryption technique(s), aggregation technique(s), aggregation trigger to commence aggregation, time periods for transferring subsets of the segments, and/or segment information (e.g., segment size, number of segments, data verification (e.g., checksums) for segments)); to communicate 1641 the file transfer plan, with the client's and user's preferred information, to the server; to receive 1643 an acknowledgement of the file transfer plan, in which the acknowledgement (or separate communication) indicates a postbox set up by the server for receipt of file segments, file endpoints including server endpoints accepted by the server, file transfer resources which are accepted by the server, and/or time periods which are accepted and/or extended by the server; to execute 1645 a transfer of each of the segments according to the acknowledged/accepted file transfer plan, which uploads each segment to the location indicated by the postbox resource, using the file transfer resources in the acknowledged/accepted file transfer plan, when said resources are available; to receive 1647 an indication of a success or failure of the file transfer; and to transmit an instruction to trigger an aggregation at the server of the segments (if applicable); and memory for other information (not illustrated) used by the processor 1605. The computer program instructions may be stored, for example, in ROM or PROM and may direct the processor 1605 in controlling the operation of the client 1601.

A user may invoke functions accessible through the user input device 1615. The user input device 1615 may comprise one or more of various known input devices, such as a keypad, a computer mouse, a touchpad, a touch screen, a trackball, and/or a keyboard.

Responsive to signaling from the user input device 1615, in accordance with instructions stored in memory 1611, or automatically upon receipt of certain information via the i/o interface 1609, the processor 1605 may direct a file transfer. The display 1613 may present information to the user by way of a conventional display (LCD) or other visual display, and/or by way of a conventional audible device for playing out audible messages.

The functions caused by the computer-executable program instructions are detailed further below, in addition to what has been described above.

A function initiates 1633 a file transfer from the client 1601 to a server. For example, a user at the client may operate a command to cause a file transfer specifying a file, a destination, and any user preferences (such as preferred timing, preferred endpoints, encryption/decryption mechanism, compression technique, and/or the like). Various techniques are known for commanding a file transfer; various techniques are known for obtaining user preferences regarding file transfers.

A function determines 1635 file transfer resources which are available at the client (for example, network baselining, security restrictions, cost restrictions, platform vulnerabilities, file transfer processes, compression, encryption, channels, etc. This may be conveniently implemented as, e.g., the network analyzer (discussed elsewhere in detail). Network baselining may be conducted in response to the command to perform the file transfer, and/or may be conducted periodically and maintained as data is transferred. Techniques are known for determining a computer's available file transfer processes, available compression techniques, available encryption techniques, available channels, available endpoints, and the like.

A function segments 1637 the file which is to be transferred into appropriately sized segments, including to determine segment size based on file transfer resources so as to avoid a failure on a segment. The processor 1705 can determine one or more segment size which is likely to not fail based on the network baselining results, at various time slots, on various endpoints, on various available channels, using known techniques. One or more segment sizes can be determined as appropriate for use with, e.g., specific time slots, specific endpoints, or the like; for example, a time slot on a busy day may be appropriate for use with a smaller segment size than a time slot on a not-busy day.

A function prepares 1639 a file transfer plan that specifies user preferences and client preferred file transfer resources which are preferred and available to the client (such as file transfer processes, client end points, authentication mechanism(s), encryption technique(s), aggregation technique(s), aggregation trigger to commence aggregation, time slots for transferring subsets of the segments, and/or maximum time duration for completing the file transfer. The file transfer plan also includes the file metadata, e.g., file name of the file to be transferred, file size, file path where the file is located, and segment information (e.g., segment size, number of segments, data verification (e.g., checksums) for segments)). Techniques for determining time slots, endpoints, and the like, preferred for use on the client, were discussed above in connection with FIG. 6 to FIG. 15.

A function communicates 1641 the file transfer plan, with the file metadata, and client's and user's preferred information, to the server. Any method for transmitting or communicating information from a client to a server may be used.

It is expressed that the server will treat the file transfer plan as an instruction to commence a file transfer which includes an individual file transfer for each of the segments indicated in the file transfer plan, using one or more of the preferred file transfer resources indicated therein, so that all of the segments in the file are eventually uploaded within the time specified therein.

A function receives 1643 an acknowledgement of the file transfer plan, in which the acknowledgement (or separate communication) indicates a postbox set up by the server for receipt of file segments, file endpoints including server endpoints accepted by the server, file transfer resources which are accepted by the server, and/or time periods which are accepted and/or extended by the server. The client will extract the information which differs from what was requested, and will use that information instead of what it requested; for example, if the server acknowledges only one of the two requested encryption techniques, the client will limit itself to the acknowledged encryption techniques; if the server suggests additional time slots and declines some time slots, the client will limit itself to the time slots which were not declined and may extend itself to the additional time slots. Once the file transfer plan is acknowledged/accepted, the client expects that the server has defined respective locations to which each respective segment is uploaded. The client expects that the server will maintain the locations for the segments as each segment is uploaded, individually, from time-to-time (possibly days) as appropriate time slots and resources are available (defined in the file transfer plan). The client expects that the server will maintain these locations for the segments for the indicated time duration, e.g., for 10 days, so that each segment of the file may be uploaded to the server as the client determines that the accepted file transfer resources are available. In embodiments, encryption/decryption, and/or compression/decompression may be omitted, or may be performed in a different sequence relative to each other and relative to segmentation, provided that the sequences of segmentation, encryption, compression (and decompression, decryption, and aggregation) are mutual.

A function executes 1645 a transfer of each of the segments according to the acknowledged/accepted file transfer plan, which uploads each segment to the location indicated by the postbox resource, using the file transfer resources in the acknowledged/accepted file transfer plan, when said resources are available. In particular, for each segment, the client establishes a connection for the file transfer, between the endpoints according to the file transfer process indicated for the time slot; techniques are known for establishing a connection for a file transfer. Then, for each segment, the client performs the transfer according to the indicated file transfer protocol; techniques are known for file transfer protocols, e.g., SFTP, or the like. Then, the file transfer connection may be disconnected. From connection through disconnection is referred to as a "file transfer session." One segment may be individually transferred in a single file transfer session. In some embodiments, plural segments may be transferred in a single file transfer session, provided that time is available during a time slot. The client may again transfer a segment which is not successfully uploaded (for example, for which an acknowledgement is not received by the client) one or more additional times. The client may track which of the segments are or are not successfully uploaded to the server.

A function receives 1647 an indication of a success or failure of the file transfer. The success/failure from the server is intended to indicate that all segments were uploaded, decryption (if specified) was successful, decompression (if specified) was successful, and aggregation (if specified) was successful. If the file transfer plan requires an aggregation trigger commend to be sent to the server, the client will transmit an instruction to trigger an aggregation at the server of the segments.

FIG. 17 is a block diagram illustrating portions of a server supporting a file transfer which can be diversified. The server 1701 may include one or more controllers 1703, a processor 1705, an i/o interface 1709 for communication over a network 1707 with, e.g., a client 1721, a memory 1711, an optional display 1713, a storage which is the destination of the uploaded file 1717 and the data segments 1719 as they are uploaded, and/or an optional user input device such as a keyboard 1715.

The processor 1705 may comprise one or more microprocessors and/or one or more digital signal processors. The memory 1711 may be coupled to the processor 1705 and may comprise a read-only memory (ROM), a random-access memory (RAM), a programmable ROM (PROM), and/or an electrically erasable read-only memory (EEPROM). The memory 1711 may include multiple memory locations for storing, among other things, an operating system, data and variables 1731 for programs executed by the processor 1705; executable computer program instructions for causing the processor 1705 to operate in connection with various functions such as to receive 1733 a file transfer plan; to determine 1735 file transfer resources at the server; to create 1737 a postbox that controls upload destination of the segments in the file; to communicate 1739 the postbox information and plan acknowledgement to the client; to execute 1741 the file transfer process specified in the acknowledged/accepted file transfer plan so as to upload each segment to the segment locations specified in the postbox; to decrypt and/or decompress 1743 segments; to aggregate 1745 the segments as a transferred file; and to indicate 1747 success or failure to the client; memory (local or remote) for the postbox 1749 (described in detail above) that specifies virtual segment addresses and segment checksums; and memory for other information (not illustrated) used by the processor 1705. The computer program instructions may be stored, for example, in ROM or PROM and may direct the processor 1705 in controlling the operation of the server 1701. Automatically upon receipt of certain information via the i/o interface 1709, the processor 1705 may direct a file transfer.

The processor 1705 performs a function to receive 1733 a file transfer plan from a client, to upload a file, which specifies transfer resources available at and requested by the client. Appropriate techniques are known for receiving information from another computer. The file transfer plan is described in detail elsewhere.

The processor 1705 performs a function to determine 1735 file transfer resources which are available and preferred at the server, such as by network baselining, considering security restrictions, considering cost restrictions, considering platform vulnerabilities, as described in detail above. The processor 1705 determines which of these match the file transfer resources which were requested by the client in the file transfer plan. As described above, the processor 1705 at the server may extend the time slots for the file transfer to include those preferred at the server.

The processor 1705 performs a function to create 1737 a postbox that controls upload destination of the segments in the file. Creation of a post box is described in detail above.

The processor 1705 performs a function to communicate 1739 the postbox information and plan acknowledgement to the client. Appropriate techniques are known for transmitting information to another computer. The postbox information and plan acknowledgement may be included in a single communication, or may be in separate communications.

The processor 1705 performs a function to execute 1741 the file transfer process specified in the acknowledged/accepted file transfer plan so as to upload each data segment to the segment locations specified in the postbox. As described above, a single file transfer session may be for one data segments, or a plurality of data segments. The server may send an acknowledgement to the client which indicates that one (or more) data segments were successfully received, either before or after performing a successful decryption/decompression.

The processor 1705 performs a function to decrypt and/or decompress 1743 segments, and the processor 1705 performs a function to aggregate 1745 the segments as a transferred file, as discussed previously.

The processor 1705 performs a function to communication 1747 success or failure, with regard to all of the segments in the entire file, to the client. If all segments have not been successfully received by the indicated time duration, a failure indication may be sent by the processor.

It should be understood that FIG. 16 and FIG. 17 are described in connection with logical groupings of functions or resources. One or more of these logical groupings may be performed by different components from one or more embodiments. Likewise, functions may be grouped differently, combined, or augmented without parting from the scope. Similarly, the present description may describe various \ collections of data and information. One or more groupings of the data or information may be omitted, distributed, combined, or augmented, or provided locally and/or remotely without departing from the scope.

Figure 18:
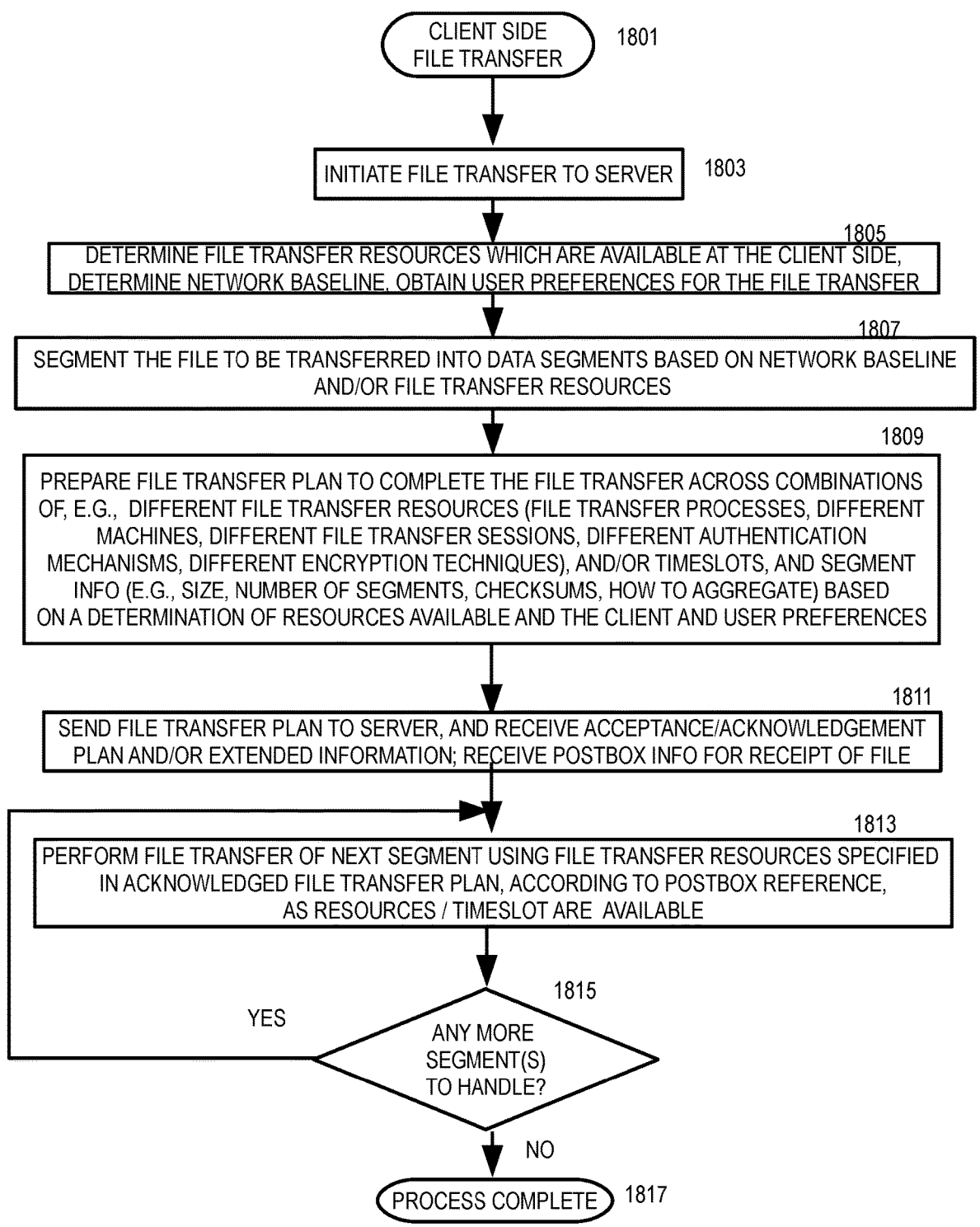
FIG. 18 is a flow chart illustrating a client side file transfer procedure.

FIG. 18 provides an illustration of a client side file transfer procedure. The procedure can advantageously be implemented on, for example, a processor of a controller, described in connection with FIG. 16 or other apparatus appropriately arranged. Details of most of these steps are described above and will be omitted.

A client side file transfer procedure 1801 includes initiating 1803 a file transfer to a server. Also included is determining 1805 file transfer resources which are available at the client side, determining a network baseline, and obtaining user preferences (if any) for the file transfer. Also included is segmenting 1807 the file to be transferred into data segments, based on the network baseline and/or preferred and available file transfer resources.

The procedure 1801 also includes preparing 1809 a file transfer plan to complete the transfer of the file across combinations of, for example, different file transfer resources (such as file transfer processes, different machines, different file transfer sessions, different authentication mechanisms, different encryption techniques), and/or timeslots; and to include metafile data specifying the file, and the segment information (segment size(s), number of segments, checksums for segments, how to aggregate the segments).

The procedure 1801 also includes sending 1811 the file transfer plan which has been prepared to the server, and then receiving an accepted/acknowledged file transfer plan, which may included extended or adjusted information. The process also includes receiving postbox information (described above) for receipt of the segments within the file. The postbox information can be stored as postbox references within the client.

The procedure 1801 also includes performing 1813 a file transfer of each data segment in the file using the file transfer resources specified in the acknowledged/accepted file transfer plan, according to the postbox references, as resources and a timeslot are available. The client may wait to send the next data segment until the client determines that resources are available during a next time slot according to the file transfer plan. As long as segments remain to be successfully uploaded 1815, the procedure continues to get and transfer the next data segment. In this way, the file transfer can complete based on different file transfer sessions from time-to-time, distributed over different time slots, and using file transfer resources as they are determined to be available during requested time slots. Since the time duration for completing the transfer may be, e.g., days, a file transfer session of a particular segment may occur while the transfer may be completed relatively quickly (e.g., on a non-busy day/time), or relatively inexpensively, using a channel and endpoints with good performance (relative to other combinations of channels/endpoints/time slots), using a predetermined segment size which is determined to be less likely to experience packet loss. Note that the procedure 1801 may arrange to suspend security restrictions, platform vulnerabilities, caching, and the like, using known techniques, because these may be unnecessary during the file transfer. When the file transfer completes (successfully or unsuccessfully), the procedure is complete 1817.

FIG. 19 provides an illustration of a server side file transfer procedure 19. The procedure can advantageously be implemented on, for example, a processor of a controller, described in connection with FIG. 17 or other apparatus appropriately arranged. Details of most of these steps are described above and will be omitted.

The file side transfer procedure 1901 includes receiving 1903 a file transfer plan from a client, as detailed above.

The procedure 1901 includes determining 1907 file transfer resources which are available at the server side, for example using network baselining, and determining security restrictions, cost restrictions, and/or vulnerabilities. The procedure 1901 may arrange to suspend security restrictions, platform vulnerabilities, caching, and the like, using known techniques, because these may be unnecessary during the file transfer.

The procedure 1901 includes creating 1909 a postbox (described above) based on the file transfer plan and segment information, for receipt of the file and segments thereof which are uploaded.

The procedure 1901 includes preparing an accepted/acknowledge transfer plan (described above), and sending the accepted/acknowledged transfer plan to the client, including the server endpoints, the postbox information, and (possible) additional time slots which extend the time periods for receipt of the file.

The procedure 1901 includes uploading 1913 each of the segments in the file indicated in the acknowledge file transfer plan, according to the postbox information, as resources and timeslots are available. As described above, a file transfer session may be initiated, for example by the server, using known techniques, and one (or more segments) are uploaded during the file transfer session. A next file transfer session for one or more remaining segments may wait until resources and timeslots specified in the file transfer plan are determined to be available. The server checks 1915 whether there are any more segments to receive.

The procedure 1901 includes decrypting and/or decompressing each of the segments, as indicated in the file transfer plan; the segments are stored at the virtual addresses indicated in the postbox layer. The procedure 1901 aggregates 1919 the segments as instructed by the file transfer plan. Once all segments are uploaded, decrypted and/or decompressed (if applicable), and aggregated (if applicable), the server indicates 1921 that the transfer is a success. If all segments are not uploaded, or not successfully decrypted, decompressed, and aggregated, during the time limit specified in the file transfer plan, the server indicates 1921 that the transfer failed.

When the file transfer completes (successfully or unsuccessfully), the procedure is complete 1923.

V. Glossary

Terms as used herein are intended to be interpreted first, as understood to one of skill in the art at a first level, of file transfers from one computer system to another computer system; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The term "computer" used herein denotes a device sometimes referred to as a computer, laptop, personal computer, tablet computer, handheld computer, smart phone, personal digital assistant, notebook computer, personal digital assistant, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

VI. Implementation Notes and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate. Further, an embodiment has been discussed in certain examples as if it is made available by a provider to a single user, a single client, and a single server. An embodiment may be used by numerous users, if preferred, for example over distributed clients and/or servers.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for a file transfer which may be diversified have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, algorithms, and flow charts, which appear herein, may be presented in terms of program procedures executed on a computer or a network of computers. The procedural descriptions and representations herein are the means used by those skilled in the art to most effectively convey the substance of their work to others skilled in the art.

The detailed descriptions which appear above may be presented in terms of program procedures executed on a computer or network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of a human operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, server area networks, firewall and SSL security, and/or applications interface software. An embodiment may be, by way of example but not by way of limitation, network-based and may (or may not) utilize a network such as the Internet, a local area network, or other network as an exemplary interface with the user for any information delivery.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

Furthermore, the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of a file transfer, comprising at a client:
in a data preparation step, determining file transfer resources, at different predetermined time slots, which are available at the client including network baselining the client during operation of the client;
in a data modeling step, based on the network baselining, automatically generating a model indicating at least an order of preference of a plurality of different predetermined time slots;
in a planning step:
    determining, based on the model, a plurality of data segments into which a file is to be segmented and a respective flexible segment size of each of the data segments and a corresponding plurality of the predetermined time slots based on expected transfer duration for a respective time slot of the predetermined time slots, and communicating a file transfer plan to upload the file to a server, the file transfer plan specifies the plurality of data segments, the respective flexible segment size of each of the data segments, and the determined file transfer resources which are available at the client, wherein the flexible segment size can be different for each of the plurality of data segments in the file and is determined based on corresponding weighted average duration of data segment transfer at the corresponding predetermined time slot;
receiving an acknowledgement of the file transfer plan which includes information identifying a postbox for receipt at the server of the file and which identifies file transfer resources which are available at the server; and
executing a file transfer process specified in the file transfer plan, based on the file transfer resources which are available at the server and at the client, to upload the plurality of data segments of the file to a location specified by the postbox at the predetermined time slots.

2. The method of claim 1,
wherein automatically generating the model further comprises indicating throughput, performance, and congestion of the file transfer resources at the plurality of different predetermined time slots at the client, based on the file transfer resources and network performance during operation of the client,
further comprising, at the client,
from the model, automatically determining preferred combinations of the file transfer resources and the different time slots to upload the file,
generating the file transfer plan which specifies the determined preferred combinations of file transfer resources and the different time slots to upload the file,
wherein the file transfer process is executed as specified in the file transfer plan which is based on the baseline of the network.

3. The method of claim 2, wherein
network baselining the client, during the operation of the client, determines the throughput, the performance, and the congestion of the file transfer resources which are available at the client, wherein the model is automatically generated based on the network baselining results.

4. The method of claim 3, wherein network baselining is further determined based on bypassing (i) security restrictions, (ii) throttling, and (iii) vulnerability checks, and based on promoted time slots.

5. The method of claim 1, further comprising, at the client:
segmenting the file into the plurality of data segments, based on the file transfer plan, wherein the file transfer process uploads each segment of the plurality of data segments,
wherein the file transfer plan further includes information identifying the plurality of data segments,
wherein the upload of the plurality of data segments is in a plurality of file transfer sessions across the corresponding plurality of the predetermined time slots specified by the file transfer plan.

6. The method of claim 5, further comprising determining whether one of the plurality of predetermined time slots is current,
when determined to not be current, waiting to execute a next file transfer session of the plurality of file transfer sessions to upload a next data segment of the plurality of data segments, until one of the plurality of predetermined time slots is available,
when determined to be current, continuing or commencing the file transfer session of the next data segment.

7. The method of claim 5, wherein at least two of the different file transfer sessions are performed in parallel.

8. A method of a file transfer, comprising at a server:
receiving a file transfer plan to upload a file from a client, the file transfer plan specifies file transfer resources which are available at the client, the file transfer plan specifies a respective flexible segment size of each of a plurality of data segments of the file, wherein the flexible segment size can be different for each data segment in the file based on corresponding weighted average duration of data segment transfer at a corresponding predetermined time slot;
determining file transfer resources which are available at the server which conform to the file transfer resources specified by the client in the file transfer plan;
creating a postbox based on the file transfer plan with the determined file transfer resources and that specifies a location to receive the plurality of data segments, for receipt at the server of the file;
communicating, to the client, information identifying the postbox and the file transfer resources which are available at the server; and
executing a file transfer process specified in the file transfer plan, to receive the plurality of data segments of the file to the location specified by the postbox.

9. The method of claim 8, further comprising, at the server,
automatically generating a model indicating throughput, performance, and congestion of the file transfer resources at each of a plurality of different predetermined time slots at the server, based on the file transfer resources and network performance during operation of the server,
from the model, automatically determining preferred combinations of the file transfer resources and the different time slots to upload the file,
determining portions of the file transfer plan which match the model of the server,
generating an acknowledged/accepted file transfer plan which further indicates the file transfer resources available at the server, wherein the file transfer resources communicated to the client are based on the portions of the file transfer plan and the file transfer resources which are available at the server.

10. The method of claim 9, further comprising, at the server,
network baselining the server, during the operation of the server, to determine the throughput, the performance, and the congestion of the file transfer resources which are available at the server, wherein the model of the server is automatically generated based on the network baselining results.

11. The method of claim 10, wherein network baselining is further determined based on bypassing (i) security restrictions, (ii) throttling, and (iii) vulnerability checks, and based on promoted time slots.

12. The method of claim 8, wherein
the file transfer plan further includes information identifying the plurality of data segments into which the file is segmented,
the postbox identifies a respective location for receipt of each of the plurality of data segments,
further comprising
receiving the plurality of data segments into each respective location; and
assembling the received data segments into the uploaded file.

13. The method of claim 10, wherein the receiving of the plurality of data segments is in different file transfer sessions across a plurality of corresponding predetermined time slots specified by the file transfer plan.

14. A method of a file transfer, comprising
at a client:
in a data preparation step, determining file transfer resources, at different predetermined time slots, which are available at the client including network baselining the client during operation of the client;
in a data modeling step, based on the network baselining, automatically generating a model indicating at least an order of preference of a plurality of different predetermined time slots;
in a planning step:
determining, based on the client model, a plurality of data segments into which a file is to be segmented and a respective flexible segment size of each of the data segments and a corresponding plurality of the predetermined time slots based on expected transfer duration for a respective time slot of the predetermined time slots, and communicating a file transfer plan to upload the file to a server, the file transfer plan specifies the plurality of data segments, the respective flexible segment size of each of the data segments, and the determined file transfer resources which are available at the client, wherein the flexible segment size can be different for each of the plurality of data segments in the file and is determined based on corresponding weighted average duration of data segment transfer at the corresponding predetermined time slot;
receiving an acknowledgement of the file transfer plan which includes information identifying a postbox for receipt at the server of the file and which identifies file transfer resources which are available at the server;
executing a file transfer process specified in the file transfer plan, based on the file transfer resources which are available at the server and at the client, to upload the plurality of data segments of the file to a respective location specified by the postbox at the predetermined time slots;

at the server:
receiving the file transfer plan to upload the file from the client, the file transfer plan specifies the file transfer resources which are available at the client, the file transfer plan specifies the respective flexible segment size of each of the plurality of data segments of the file, wherein the flexible segment size can be different for each data segment in the file based on corresponding weighted average duration of data segment transfer at the corresponding predetermined time slot;

determining file transfer resources which are available at the server which conform to the file transfer resources specified by the client in the file transfer plan;

creating the postbox based on the file transfer plan with the determined file transfer resources and that specifies a location to receive the plurality of data segments, for receipt at the server of the file;

communicating, to the client, information identifying the postbox and the file transfer resources which are available at the server; and executing the file transfer process specified in the file transfer plan, to receive the plurality of data segments of the file to the location specified by the postbox.

15. The method of claim 14,
wherein, at the client,
automatically generating the client model further comprises indicating throughput, performance, and congestion of the file transfer resources at the plurality of different predetermined time slots at the client, based on the file transfer resources and network performance during operation of the client,
further comprising, at the client,
from the client model, automatically determining preferred combinations of the file transfer resources and the different time slots to upload the file,
generating the file transfer plan which specifies the determined preferred combinations of file transfer resources and the different time slots to upload the file,
wherein the file transfer process is executed as specified in the file transfer plan which is based on the baseline of the network,
further comprising, at the server,
automatically generating a server model indicating throughput, performance, and congestion of the file transfer resources at different predetermined time slots at the server, based on the file transfer resources and network performance during operation of the server,
from the server model, automatically determining preferred combinations of the file transfer resources and the different time slots to upload the file,
determining portions of the file transfer plan which match the server model,
generating an acknowledged/accepted file transfer plan which further indicates the file transfer resources available at the server, wherein the file transfer resources communicated to the client are based on the portions of the file transfer plan and the file transfer resources which are available at the server.

16. The method of claim 14, further comprising, by a network analyzer,
network baselining, during the operation, to determine the throughput, the performance, and the congestion of the file transfer resources which are available, wherein the client model or a server model is automatically generated based on the network baselining results,
wherein the network analyzer is provided on each of the client and the server.

17. The method of claim 14, further comprising, at the client:
segmenting the file into the plurality of data segments, based on the file transfer plan, wherein the file transfer process uploads each segment of the plurality of data segments,
wherein the file transfer plan further includes information identifying the plurality of data segments,
wherein the upload of the plurality of data segments is in a plurality of file transfer sessions across the corresponding plurality of the predetermined time slots specified by the file transfer plan.

18. The method of claim 17, further comprising, at the client,
determining whether one of the plurality of predetermined time slots is current,
when determined to not be current, waiting to execute a next file transfer session of the plurality of file transfer sessions to upload a next data segment of the plurality of data segments, until one of the plurality of predetermined time slots is available,
when determined to be current, continuing or commencing the file transfer session of the next data segment.

19. The method of claim 17, wherein at least two of the different file transfer sessions are performed in parallel.

20. The method of claim 17, wherein
the postbox identifies a respective location for receipt of each of the plurality of data segments,
further comprising at the client:
uploading each of the respective data segments into the respective location identified in the postbox;
further comprising at the server:
receiving the plurality of data segments into each respective location; and
assembling the received data segments from each respective location into the uploaded file.

21. A non-transitory computer-readable storage medium comprising instructions for performing the method of claim 1.

22. A non-transitory computer-readable storage medium comprising instructions for performing the method of claim 8.

* * * * *